(12) United States Patent
Chamberlin

(10) Patent No.: US 9,525,325 B2
(45) Date of Patent: *Dec. 20, 2016

(54) LIQUID-COOLED ROTARY ELECTRIC MACHINE HAVING AXIAL END COOLING

(71) Applicant: Remy Technologies, LLC, Pendleton, IN (US)

(72) Inventor: Bradley D. Chamberlin, Pendleton, IN (US)

(73) Assignee: Remy Technologies, LLC, Pendleton, IN (US)

(*) Notice: Subject to any disclaimer, the term of this patent is extended or adjusted under 35 U.S.C. 154(b) by 514 days.

This patent is subject to a terminal disclaimer.

(21) Appl. No.: 13/784,789

(22) Filed: Mar. 4, 2013

(65) Prior Publication Data

US 2014/0246932 A1    Sep. 4, 2014

(51) Int. Cl.
*H02K 9/19* (2006.01)
*H02K 5/20* (2006.01)
*H02K 9/10* (2006.01)

(52) U.S. Cl.
CPC ........... *H02K 9/19* (2013.01); *H02K 5/20* (2013.01); *H02K 9/10* (2013.01)

(58) Field of Classification Search
CPC ............... H02K 5/20; H02K 9/10; H02K 9/19
USPC .................................. 310/52, 54, 57, 58, 64
See application file for complete search history.

(56) References Cited

U.S. PATENT DOCUMENTS

| 3,714,478 | A  | * | 1/1973 | DeMania ........... H02K 9/10 310/55 |
| 5,859,482 | A  | * | 1/1999 | Crowell et al. .............. 310/58 |
| 5,939,808 | A  | * | 8/1999 | Adames ............ H02K 5/20 310/54 |
| 6,087,744 | A  | * | 7/2000 | Glauning ........... H02K 1/32 310/58 |
| 6,200,108 | B1 | * | 3/2001 | Caudill ............. F04D 13/06 165/47 |
| 6,909,210 | B1 | * | 6/2005 | Bostwick .................. 310/52 |
| 7,009,317 | B2 | * | 3/2006 | Cronin et al. ............. 310/54 |
| 7,745,965 | B2 | * | 6/2010 | Oestreich .......... H02K 5/20 310/52 |
| 2008/0185924 | A1 | * | 8/2008 | Masoudipour et al. ....... 310/54 |
| 2009/0009013 | A1 | * | 1/2009 | Baumann et al. .......... 310/54 |
| 2011/0169352 | A1 | * | 7/2011 | Nagao et al. ............. 310/59 |

(Continued)

*Primary Examiner* — Terrance Kenerly
*Assistant Examiner* — Rashad Johnson
(74) *Attorney, Agent, or Firm* — Bose McKinney & Evans LLP

(57) ABSTRACT

A liquid-cooled rotary electric machine including jacket defining a heat transfer surface in conductive thermal communication with a stator and having an axial end portion partially enclosing an interior volume. A heat source is in conductive thermal communication with a wall of the jacket axial end portion. A fluid channel traverses the heat transfer surface between opposite axial ends of the jacket, and a fluid passage in fluid communication with the fluid channel is defined by jacket axial end portion walls. A flow path of liquid coolant through the machine is defined by the fluid channel and the fluid passage between a machine coolant inlet and outlet, whereby at least a portion of heat transferable between the heat source and the fluid passage is convectively transferable between the jacket axial end portion walls and liquid coolant along the flow path. Also a method for liquid-cooling a rotary electric machine.

17 Claims, 18 Drawing Sheets

(56) References Cited

U.S. PATENT DOCUMENTS

| | | | |
|---|---|---|---|
| 2012/0217826 A1* | 8/2012 | Jiang | H02K 5/20 310/54 |
| 2014/0069099 A1* | 3/2014 | Rohwer | H02K 5/20 60/714 |
| 2014/0077634 A1* | 3/2014 | Fischer | F28F 13/06 310/54 |
| 2015/0097450 A1* | 4/2015 | Xu | H02K 9/10 310/54 |

* cited by examiner

LIQUID-COOLED ROTARY ELECTRIC MACHINE HAVING AXIAL END COOLING

CROSS-REFERENCE TO RELATED APPLICATIONS

The present application is related to the following patent applications: U.S. patent application Ser. No. 13/784,227 entitled LIQUID-COOLED ROTARY ELECTRIC MACHINE HAVING COOLING JACKET WITH BI-DIRECTIONAL FLOW filed Mar. 4, 2013; U.S. patent application Ser. No. 13/784,390 entitled LIQUID-COOLED ROTARY ELECTRIC MACHINE HAVING FLUID CHANNEL WITH AUXILIARY COOLANT GROOVE filed Mar. 4, 2013; and U.S. patent application Ser. No. 13/784,799 entitled LIQUID-COOLED ROTARY ELECTRIC MACHINE HAVING HEAT SOURCE-SURROUNDING FLUID PASSAGE filed Mar. 4, 2013, each respective disclosure of which is incorporated herein by reference.

BACKGROUND

The present disclosure relates to rotary electric machines, such as electric generators, alternators, and motors, rotatable in a single or opposite directions about an axis, and particularly to such rotary electric machines of the type that are liquid-cooled.

Rotary electric machines are increasingly being operated at higher internal temperatures, and there is an increasing need to provide improved cooling of such machines to enhance their performance and reliability. While air-cooling rotary electric machines is common, certain operating environments for such machines do not lend themselves well to air-cooling them. Such environments may, for example, provide little room about the machine for air circulation or exchange, position the machine in close proximity to heated components that adversely warm the cooling air directed to the machine, or ambient air may include contaminants (e.g., dust, chaff) that can clog cooling air passages of the machine, blocking airflow therethrough and preventing adequate cooling.

It is known to liquid cool rotary electric machines by including them in a cooling circuit dedicated to cooling the machine, or with other components to be liquid-cooled. Typically, such a circuit includes a pump for inducing coolant flow through the circuit and a heat exchanger for removing heat from the coolant, which may, for example, be water, oil, or a glycol solution. The coolant is provided under pressure into a coolant inlet of the machine, circulates therethrough and absorbs heat via convective heat transfer, and is expelled from the machine through a coolant outlet, the machine coolant inlet and outlet providing locations at which the machine is joined to the cooling circuit. Such cooling circuits are well-known and beyond the scope of the present disclosure, and are not further described in detail herein.

Minimizing the size of a rotary electric machine while maximizing the heat rejection from the machine is critical to its reliability and successful long term operation.

SUMMARY

In accordance with the present disclosure, structures and methods for improving liquid cooling of a rotary electric machine and additional heat sources found within such a machine, are provided.

The present disclosure provides a liquid-cooled rotary electric machine including a coolant inlet and a coolant outlet, a stator having a central axis, a rotor surrounded by the stator and having rotation relative to the stator about the central axis, and a jacket defining a heat transfer surface in conductive thermal communication with the stator. The jacket has opposite axial ends, an interior volume in which the stator and rotor are located, and an axial end portion having walls. The interior volume is partially enclosed by the jacket axial end portion. The machine has a fluid channel traversing the jacket heat transfer surface between the jacket axial ends, and a fluid passage defined by jacket axial end portion walls. The fluid passage is in fluid communication with the fluid channel. A flow path of liquid coolant through the machine is defined by the fluid channel and the fluid passage between the coolant inlet and the coolant outlet. The machine also includes a heat source in conductive thermal communication with a jacket axial end portion wall. Accordingly, at least a portion of heat transferable between the heat source and the fluid passage is convectively transferable between the jacket axial end portion walls and liquid coolant along the flow path.

An additional aspect of this disclosure is that the fluid passage has first and second openings between which the flow path of liquid coolant through the machine extends, the fluid channel and the fluid passage fluidly connected to each other via one of the first and second openings.

Furthermore, an aspect of this disclosure is that the other of the first and second openings is fluidly connected to one of the coolant inlet and the coolant outlet. Moreover, an aspect of this disclosure is that the jacket axial end portion walls define a port isolated from the fluid passage and to which the fluid channel is fluidly connected, and the other of the coolant inlet and the coolant outlet is fluidly connected to the port.

Furthermore, an aspect of this disclosure is that the first and second openings are located at opposite ends of the fluid passage along the flow path.

Furthermore, an aspect of this disclosure is that the flow path may be generally spiral-shaped between the first and second openings.

Furthermore, an aspect of this disclosure is that the flow path may be substantially annular between the first and second openings.

An additional aspect of this disclosure is that the heat source is located axially adjacent to a jacket axial end portion wall relative to the central axis.

An additional aspect of this disclosure is that the heat source is located radially adjacent to a jacket axial end portion wall relative to the central axis.

An additional aspect of this disclosure is that the jacket axial end portion fully encloses the interior volume at one jacket axial end.

An additional aspect of this disclosure is that the fluid passage and the heat source do not overlap axially.

An additional aspect of this disclosure is that the machine includes power electronics, and the heat source includes the power electronics.

Furthermore, an aspect of this disclosure is that the machine includes a cover disposed over the jacket axial end portion and defines the fluid passage, the power electronics disposed between the cover and a jacket axial end portion wall.

An additional aspect of this disclosure is that the machine includes a bearing supported by the jacket axial end portion, the rotor is supported within the jacket interior volume by the bearing, and the heat source includes the bearing.

An additional aspect of this disclosure is that the heat source is located axially between the rotor and the fluid passage.

An additional aspect of this disclosure is that, relative to the central axis, a portion of the fluid passage extends radially outward of the heat source.

An additional aspect of this disclosure is that the machine includes a separable cover that defines the fluid passage, and the fluid passage is located between the rotor and the cover in a direction parallel to the central axis.

Furthermore, an aspect of this disclosure is that the heat source is disposed axially between the cover and a jacket axial end portion wall.

An additional aspect of this disclosure is that the heat source is disposed axially between the rotor and the jacket axial end portion.

The present disclosure also provides a method for liquid-cooling a rotary electric machine. The method includes the steps of: conveying liquid coolant along a fluid channel traversing a heat transfer surface of a jacket in conductive thermal communication with a stator surrounding a rotor, and along a fluid passage fluidly connected in series to the fluid channel and defined by a jacket axial end portion partially enclosing an interior volume in which the stator and rotor are located; and convectively transferring heat from the stator through the heat transfer surface and from a heat source in conductive thermal communication with a wall of the jacket axial end portion, to liquid coolant along a flow path defined by the fluid channel and the fluid passage that extends between a coolant inlet and a coolant outlet of the machine.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

Figure 1:
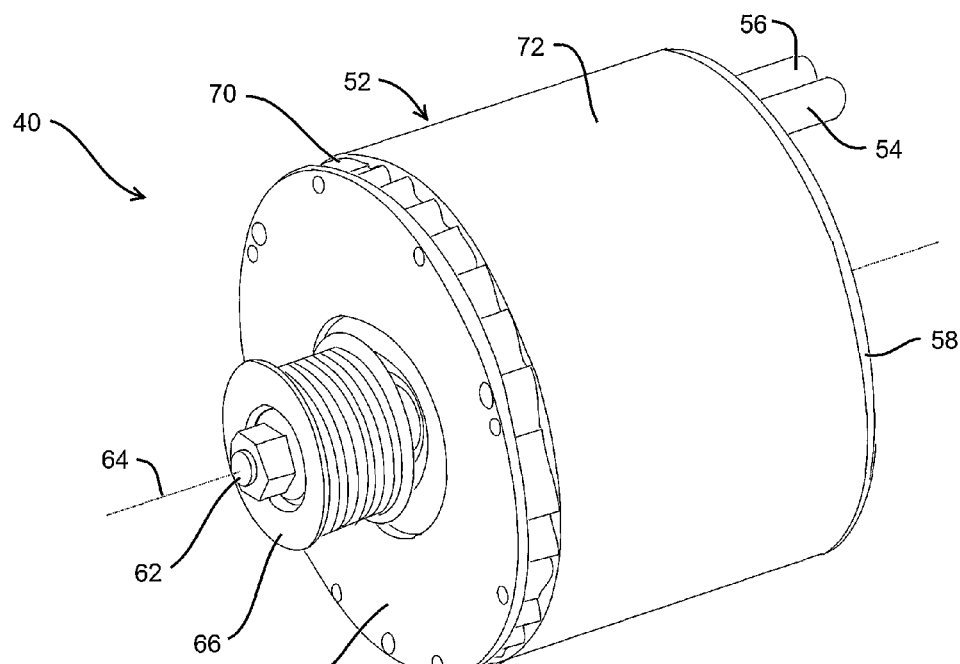
FIG. 1 is a front perspective view of a first embodiment of a rotary electric machine according to the present disclosure.

Corresponding reference characters indicate corresponding parts throughout the several views. Although the drawings represent an embodiment of the disclosed device and method, the drawings are not necessarily to scale or to the same scale and certain features may be exaggerated in order to better illustrate and explain the present disclosure. Moreover, in accompanying drawings that show sectional views, cross-hatching of various sectional elements may have been omitted for clarity. It is to be understood that any omission of cross-hatching is for the purpose of clarity in illustration only.

DETAILED DESCRIPTION

The embodiment of the present disclosure is not intended to be exhaustive or to limit the invention to the precise form disclosed in the following detailed description. Rather, the embodiment is chosen and described so that others skilled in the art may appreciate and understand the principles and practices of the present disclosure.

The exemplary rotary electric machine embodiments depicted herein are belt-driven alternators, but it is to be understood that they may alternatively be other types of driven or driving rotary electric machines such as generators or motors.

Figure 2:
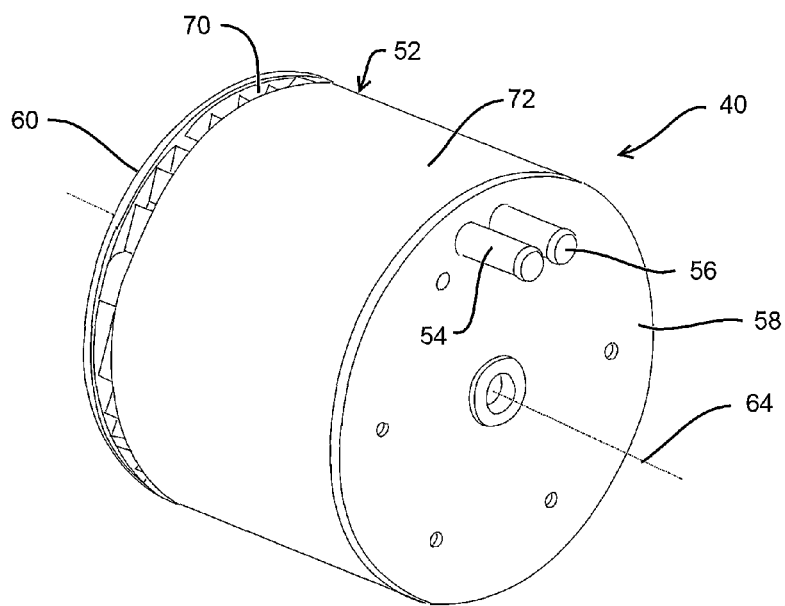
FIG. 2 is a rear perspective view of the first embodiment rotary electric machine.
Figure 3:
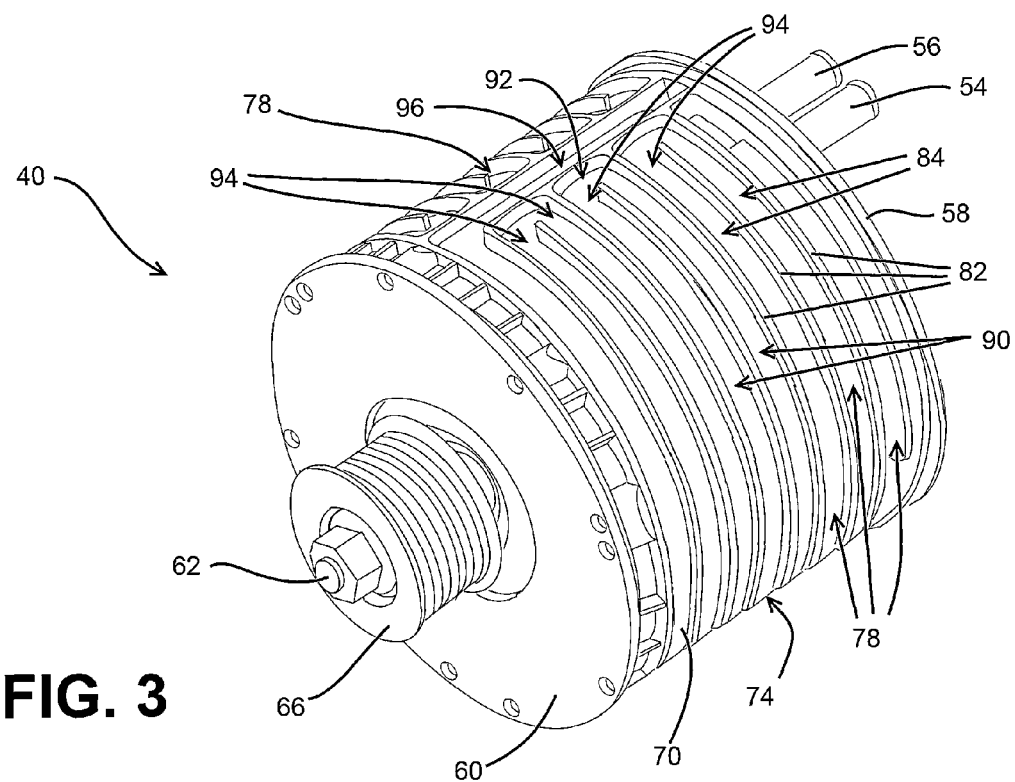
FIG. 3 is a front perspective view of the first embodiment rotary electric machine with its housing sleeve removed.
Figure 4:
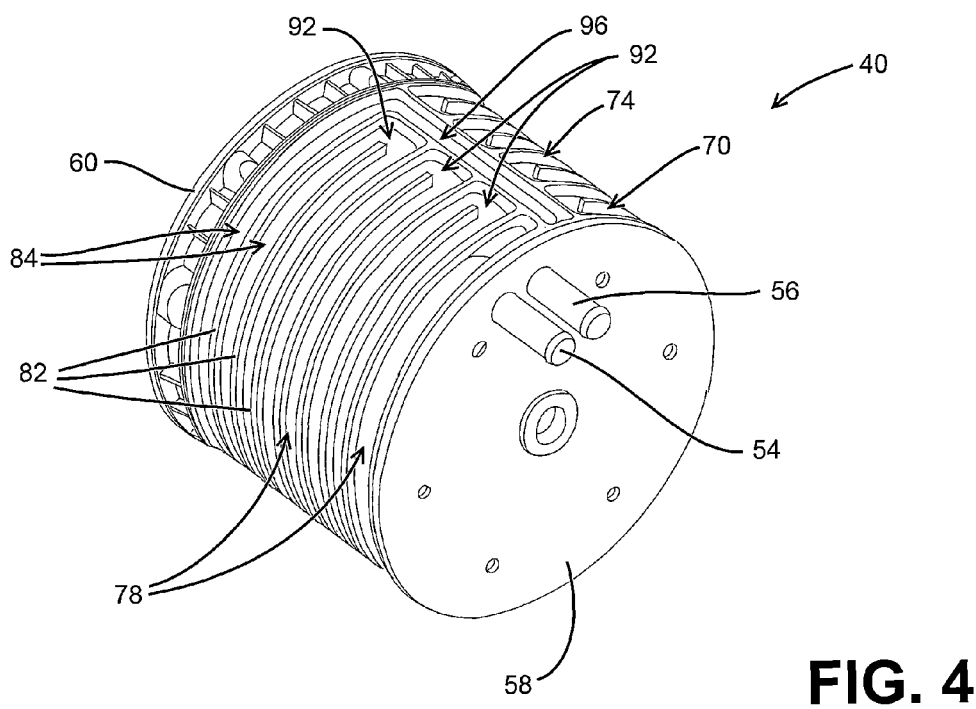
FIG. 4 is a rear perspective view of the first embodiment rotary electric machine with its housing sleeve removed.
Figure 5:
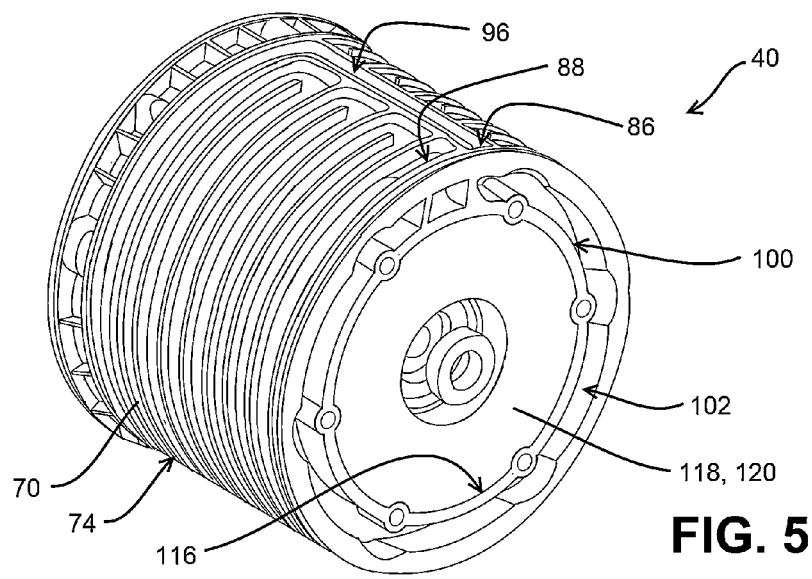
FIG. 5 is a rear perspective view of the first embodiment rotary electric machine with its housing sleeve and rear cover removed.
Figure 6:
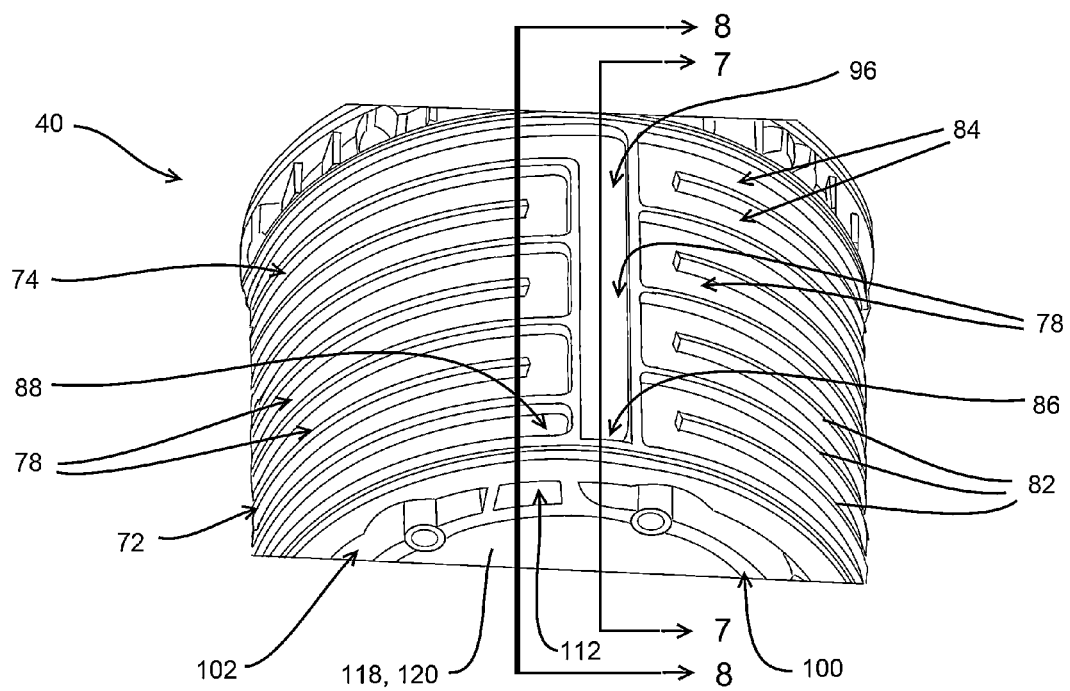
FIG. 6 is a fragmented top perspective view of the first embodiment rotary electric machine with its housing sleeve and rear cover removed.

FIGS. 1 through 10 show first embodiment rotary electric machine 40. Machine 40 includes rotor 42 and stator 44 (FIGS. 7 and 8) having relative rotation therebetween. Referring to FIGS. 1 and 2, machine 40 has generally cylindrical housing 52 provided with first coolant fitting 54 and second coolant fitting 56. As shown, liquid coolant is received into housing 52 via first coolant fitting 54, which is a coolant inlet to machine 40; liquid coolant is expelled from housing 52 via second coolant fitting 56, which is a coolant outlet from machine 40. It is to be understood that fittings 54 and 56 may be reversed with regard to their serving as the coolant inlet and outlet to and from machine 40, with a consequent reversal of the direction of liquid coolant flow through the machine, and characterizations such as inlet, outlet, entry, and/or exit, relating to the machine structure and operation, and the direction of coolant flow along the liquid coolant flow path, would also be similarly reversed.

With regard to the depicted embodiment, once it is installed and operative, inlet fitting 54 is provided with pressurized liquid coolant from a supply external to rotary electric machine 40, as by a coolant supply hose (not shown) clamped or otherwise securely connected thereto, and outlet fitting 56 is similarly connected to a coolant return hose (not shown) that conveys coolant expelled from machine 40, which is subsequently cooled. Typically, machine 40 is part of a closed-loop coolant system of a well-known type that includes a liquid coolant pump and a heat exchanger (not shown).

Figure 7:
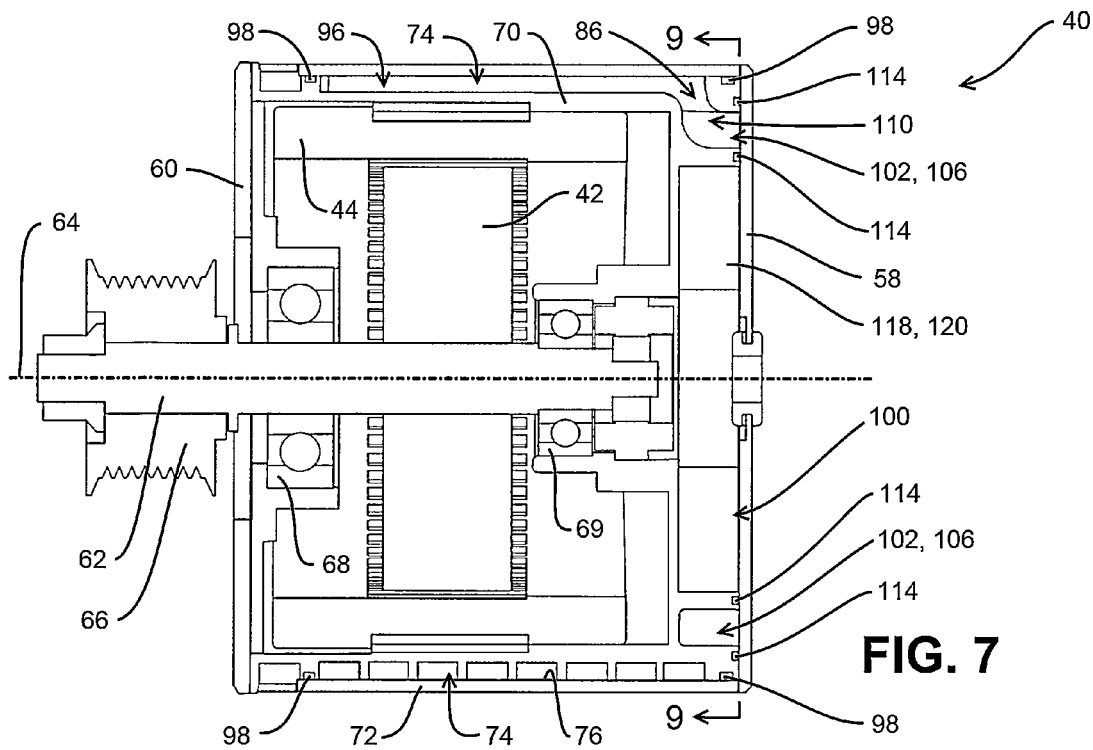
FIG. 7 is a cross-sectional view of the first embodiment rotary electric machine along line 7-7 of FIGS. 6 and 9.
Figure 8:
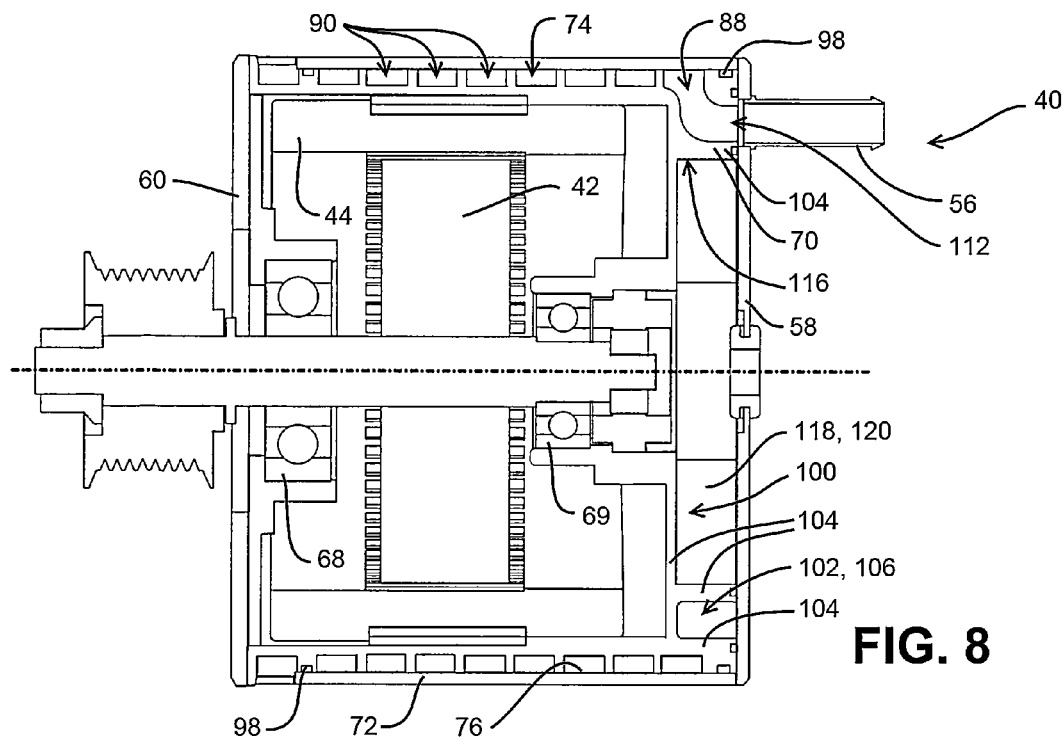
FIG. 8 is a cross-sectional view of the first embodiment rotary electric machine along line 8-8 of FIGS. 6 and 9.

Fittings 54, 56 may be formed from steel tubing and are affixed to circular, planar, removable rear cover 58 that forms one axial end of cylindrical housing 52. Rear cover 58 is rigid, and may be formed from steel plate material having apertures into which the axially inward ends of fittings 54, 56 are inserted and attached to cover 58, as by brazing, for example. Housing 52 also includes a circular, rigid, planar front cover 60, which may also be formed from steel plate material. Front cover 60 is provided with a central aperture through which extends shaft 62, which is rotatable about central axis 64 and rotatably fixed to rotor 42. Rotor 42 and shaft 62 may be rotatable in only one direction, or both directions, about axis 64. In the embodiment shown, pulley 66 is rotatably fixed to shaft 62 externally of housing 52, for driving rotor 42 with a belt (not shown). Internally of housing 52, shaft 62 is supported by front and rear bearings 68, 69, as shown in FIGS. 7 and 8.

Machine 40 includes a generally cylindrical jacket 70 which is in conductive thermal communication with stator 44 and forms part of housing 52. Jacket 70 is preferably cast of a highly thermally conductive, rigid material such as, for example, aluminum, but may alternatively be ferrous, and/or a stamping or a weldment. Disposed radially about jacket 70 is open-ended, cylindrical sleeve 72, which may be formed of metallic (e.g., steel or aluminum) or plastic sheet material, for example. Jacket 70 provides a generally cylindrical, radially outer heat transfer surface 74, and tubular sleeve 72 provides an interfacing, cylindrical, radially inner containment surface 76. Between radially outer heat transfer surface 74 and radially inner containment surface 76 is located fluid channel 78 which defines flow path 80 for liquid coolant through machine 40. In other words, fluid channel 78 is located axially between the opposite axial ends of tubular sleeve 72, and in spaces radially between superposed radially outer and inner surfaces 74 and 76. At least a portion of flow path 80 for liquid coolant through machine 40 follows fluid channel 78.

As shown, generally cylindrical radially outer heat transfer surface 74 of jacket 70 has a plurality of elongate walls 82 and interconnected recesses 84 bounded by walls 82. The radially outermost surfaces of walls 82 are in contact with cylindrical, smooth, radially inner containment surface 76 of sleeve 72, which is substantially featureless. Fluid channel 78 is thus located radially between sleeve inner containment surface 76 and the floors of recesses 84. Flow path 80 follows interconnected recesses 84. As shown, the cross section of fluid channel 78 may be substantially rectangular and generally uniform in shape, but may be of another shape, and/or nonuniform. The hydraulic diameter of fluid channel 78 may be altered along flow path 80 to affect coolant flow and/or heat transfer conditions as desired.

Jacket 70 and sleeve 72 are attached, for example, by being interference or thermally fitted together in a known manner, as by cooling jacket 70 and heating sleeve 72 prior to their assembly, and then allowing their temperatures to equalize after being positioned relative to each other. Alternatively, they may be attached by crimping or welding, or with fasteners (not shown), or by other conventional means. Moreover, those of ordinary skill in the art will recognize that, instead of jacket 70 and sleeve 72 being structured as shown, it may be that jacket radially outer heat transfer surface 74 is substantially featureless, and that sleeve radially inner containment surface 76 is provided with walls and recesses which define fluid channel 78. Referring to FIGS. 7 and 8, seals 98 are provided between jacket 70 and sleeve 72, axially outside of fluid channel 78 and proximate the opposite axial ends of sleeve 72, to prevent coolant leakage from machine 40.

At opposite ends of fluid channel 78, at locations along flow path 80 near the rear axial end of jacket 70, are fluid channel entry 86 and exit 88 which extend through jacket 70, radially inward of the sealed joint(s) between jacket 70 and sleeve 72. As discussed above, the designations of entry 86 and exit 88 as such may be reversed depending on the chosen direction of coolant flow along flow path 80 through machine 40. In machine 40, fluid channel 78 includes a plurality of substantially annular first fluid channel portions 90, each extending circumferentially about axis 64. The first fluid channel portions 90 are mutually parallel, and parallel to an imaginary plane (not shown) normal to axis 64. Fluid channel 78 also includes a plurality of second fluid channel portions 92, each of which extends between axially adjacent ends 94 of a pair of first fluid channel portions 90. Each second fluid channel portion 92 fluidly connects a pair of adjacent first fluid channel portions 90 serially, with the inlet end 94 of one first fluid channel portion 90 fluidly connected to the outlet end 94 of another first fluid channel portion 90 through a second fluid channel portion 92. Fluid channel portions 90 and 92 provide a series of switchbacks followed by coolant flow path 80. It may thus be understood that fluid channel 78 extends circumferentially about central axis 64 via first fluid channel portions 90, and progresses axially in a direction along axis 64 via second fluid channel portions 92. Therefore, in machine 40 flow path 80 as defined by fluid channel 78 progresses in a direction along central axis 64 (via second fluid channel portion 92) independently of flow path 180 extending substantially circumferentially about axis 64 (via first fluid channel portion 90).

Fluid channel 78 also includes elongate, generally linear third fluid channel portion 96 which extends in a direction along central axis 64. As shown, one of the two opposite ends of fluid channel portion 96 is fluidly connected to fluid channel entry 86, and the other is fluidly connected to an end 94 of the first fluid channel portion 90 located nearest front cover 60 and furthest from fluid channel entry 86. As discussed above, the plurality of first fluid channel portions 90 are fluidly connected in series through the plurality of second fluid channel portions 92 to define flow path 80. As shown, fluid channel exit 88 is located at outlet end 94 of the annular first fluid channel portion 90 located nearest rear cover 58. Fluid channel entry 86 and exit 88 are thus in fluid communication with each other within machine 40 through series-connected fluid channel portions 90, 92, and 96. In certain, unshown embodiments, the width of fluid channel 78 defined by any of fluid channel portions 90, 92, and/or 96, may be divided along the fluid channel length, locally or entirely, to provide parallel subchannels along the flow path, if desirable.

Generally cylindrical jacket 70 has an interior volume and an axial end portion 100 at the rear of machine 40. Jacket axial end portion 100 partially encloses one axial end of the jacket interior volume, in which rotor 42 and stator 44 are located. Fluid chamber 102 is defined by walls 104 of jacket axial end portion 100, and is fluidly connected to fluid channel 78. As shown, fluid chamber 102 is connected to fluid channel 78 via fluid channel entry 86. In an alternative, unshown embodiment, fluid chamber 102 may be connected to fluid channel 78 via fluid channel exit 88.

Walls 104 and rear cover 58 form substantially annular fluid passage 106 that extends between first and second openings 108, 110 of fluid chamber 102 and fluid passage 106. Fluid passage 106 also defines flow path 80. As shown, first opening 108 is located at the axially inward end of first coolant fitting 54 which, as described above, is the coolant inlet to machine 40. Alternatively, first opening 108 of fluid chamber 102 may be located in the cylindrical outer wall of jacket 70, with first coolant fitting 54 being fitted thereinto rather than affixed to cover 58 as described above and depicted in the drawings. In such an alternative, unshown embodiment, the coolant inlet fitting extends radially from machine 40, rather than being carried by and extending axially from cover 58. Liquid coolant received into fluid chamber 102 via first fitting 54 and first opening 108 is directed annularly about central axis 64 along flow path 80 through fluid passage 106, to second opening 110. In the depicted embodiment, second opening 110 is fluidly connected to entry 86 of fluid distribution channel 78.

Jacket axial end portion 100 is also provided with port 112 that is fluidly connected to exit 88 of fluid channel 78, as best seen in FIG. 8. Port 112 is fluidly isolated from fluid chamber 102 by gasket or seal 114, which also seals the joint between jacket 70 and rear cover 58 to prevent liquid coolant leakage radially outwardly or radially inwardly from fluid passage 106.

Disposed radially inwardly of the annular fluid chamber 102 is cavity 116 formed by jacket axial end portion walls 104. Cavity 116 is substantially surrounded by seal 114 and fluid chamber 102. Cavity 116 and chamber 102 are in conductive thermal communication through wall 104 which separates them. Disposed within cavity 116, and in conductive thermal communication with wall 104, is a heat source 118 in the form of power electronics module 120. Power electronics 120 are of a suitable configuration, and a type known in the relevant art for controlling electrical power that induces relative rotation between rotor 42 and stator 44, or for controlling electrical power generated by their relative rotation, as the case may be. Shaft rear bearing 69, supported in bearing mount portion 122 defined by walls 104 of jacket axial end portion 100, is another heat source 118 of machine 40.

Heat transferrable from heat source(s) 118 through jacket axial end portion wall(s) 104 is convectively transferrable to liquid coolant along flow path 80 within the fluid passage 106. Thus, heat from stator 44 and from additional heat source(s) 118 (e.g., power electronics module 120 and/or rear bearing 69) is convectively transferrable to liquid coolant along flow path 80 via the cylindrical wall of jacket 70 and jacket axial end portion 100.

Figure 9:
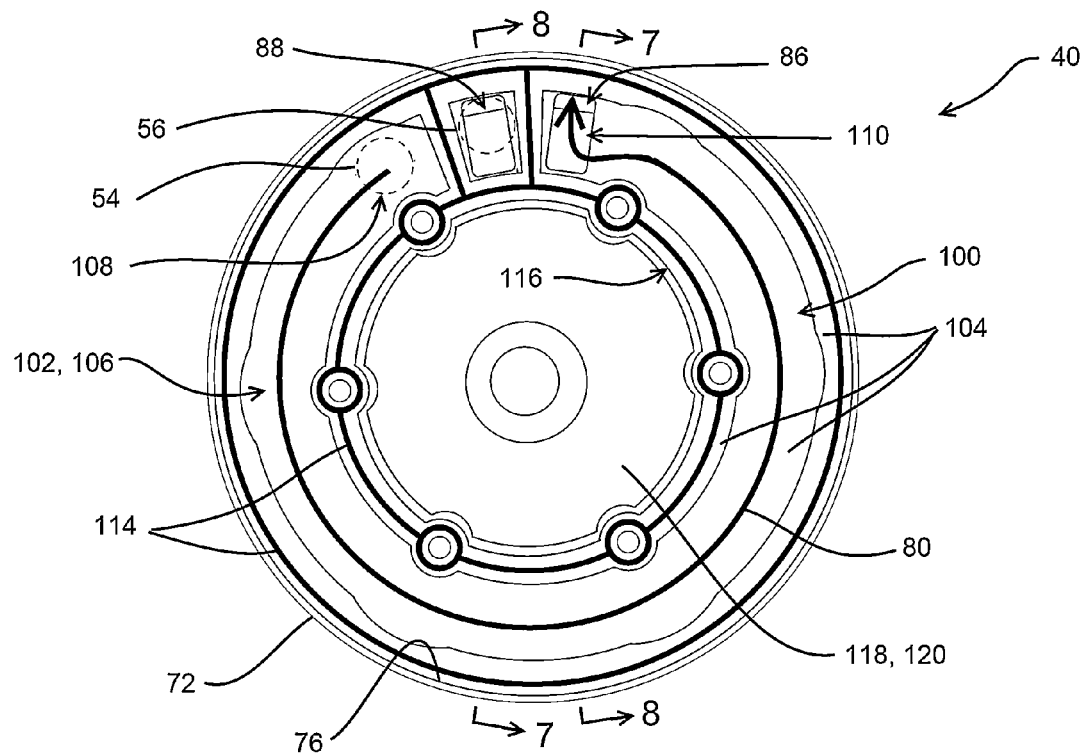
FIG. 9 is a rear end view of the first embodiment rotary electric machine without its rear cover, taken along line 9-9 of FIG. 7.
Figure 10:
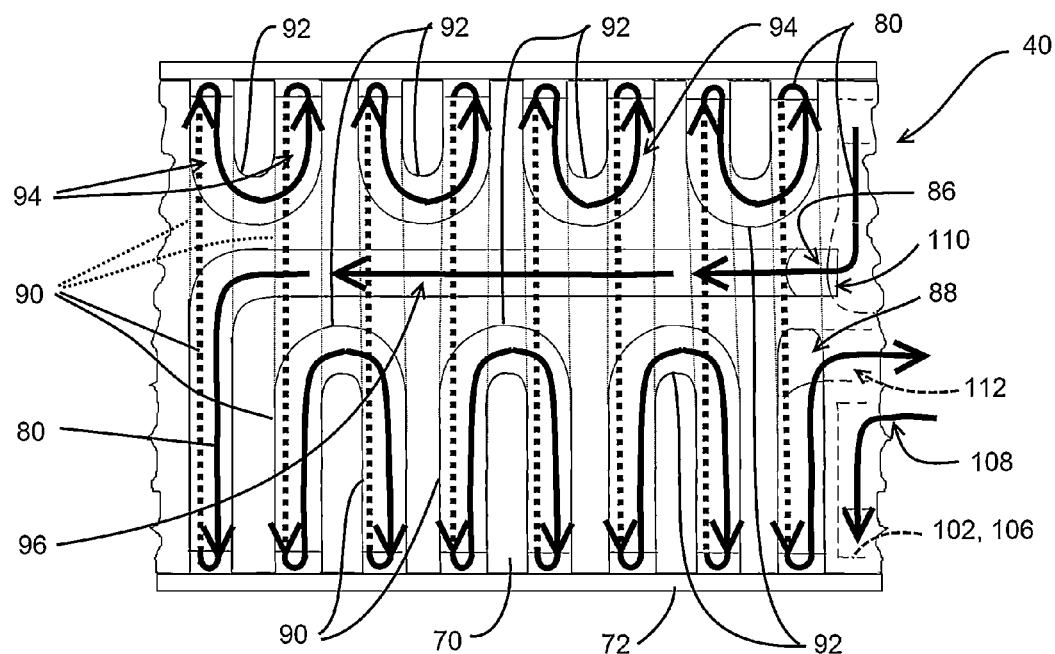
FIG. 10 is a fragmented, partially cross-sectioned top view of the first embodiment rotary electric machine showing the flow path for liquid coolant therethrough.
Figure 11:
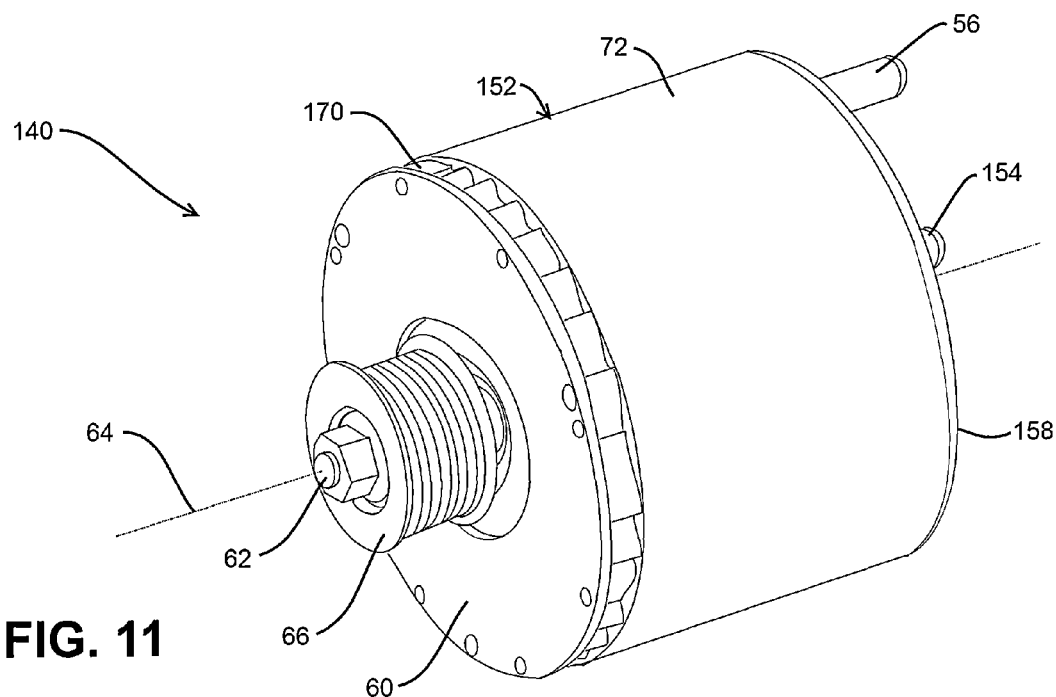
FIG. 11 is a front perspective view of a second embodiment of a rotary electric machine according to the present disclosure.

From the drawings and the above description, it can be understood that flow path 80 for liquid coolant through machine 40 begins at first coolant fitting 54, extends along annular fluid passage 106 and through fluid channel 78, and ends at second coolant fitting 56. More particularly, liquid coolant received into machine 40 through coolant inlet 54 is received via first opening 108 into fluid chamber 102, flows annularly through fluid passage 106 to second opening 110, enters entry 86 of fluid distribution channel 78 through second opening 110, and continues in a direction along central axis 64 through third fluid channel portion 96 to connected inlet end 94 of the first fluid channel portion 90 that is located nearest front cover 60. Liquid coolant in that first fluid channel portion 90 flows circumferentially about axis 64, between the interfacing surfaces 74, 76 of jacket 70 and sleeve 72, within a jacket recess 84 bounded by jacket walls 82. Once the liquid coolant reaches the opposite, outlet end 94 of that first fluid channel portion 90, it then continues axially in a direction generally along axis 64 via a second fluid channel portion 92, to the inlet end 94 of the axially adjacent first fluid channel portion 90, along which it flows circumferentially about axis 64 to the opposite, outlet end 94 of that adjacent first fluid channel portion 90. The flow path 80 of liquid coolant continues in this manner through the serially connected first and second portions 90, 92 of fluid channel 78 until reaching exit 88 of fluid channel 78. The coolant flows out of fluid channel 78 through exit 88, and to port 112, from which it flows out of machine 40 through second coolant fitting 56. Referring to FIGS. 9 and 10, the described flow path 80 for liquid coolant through machine 40 is indicated by directional arrows. Alternatively, port 112 may be located in the cylindrical outer wall of jacket 70, with second coolant fitting 56 being fitted thereinto rather than affixed to cover 58 as described above and depicted in the drawings. In such an alternative, unshown embodiment, the coolant outlet fitting extends radially from machine 40, rather than being carried by and extending axially from cover 58.

FIGS. 11 through 20 show second embodiment rotary electric machine 140 which, other than as shown in the drawings and described herein, is substantially identical in structure, operation, and function to first embodiment rotary electric machine 40. Features unique to second embodiment machine 140, and which may differ significantly from respective, corresponding features of first embodiment machine 40, are identified by reference numerals representing the sum of 100 plus the reference numeral associated with the respective feature in first embodiment machine 40.

Second embodiment machine 140 includes generally cylindrical housing 152 provided with first coolant fitting 154 and second coolant fitting 56. As shown, liquid coolant is received into housing 152 via first coolant fitting 154, which is a coolant inlet to machine 140; liquid coolant is expelled from housing 152 via second coolant fitting 56, which is a coolant outlet from machine 140. As discussed above in connection with first embodiment machine 40, it is to be understood that fittings 154 and 56 may be reversed with regard to being a coolant inlet or a coolant outlet of machine 140, with a consequent reversal of the direction of liquid coolant flow through the machine. Characterizations such as inlet, outlet, entry, and/or exit, relating to the direction of coolant flow along the liquid coolant flow path, would likewise be reversed. Second embodiment machine 140 may be substituted for first embodiment machine 40 in a liquid cooling circuit, with inlet fitting 154 similarly provided with pressurized liquid coolant from a supply external to rotary electric machine 140, and outlet fitting 56 similarly connected to a coolant return hose (not shown).

Figure 12:
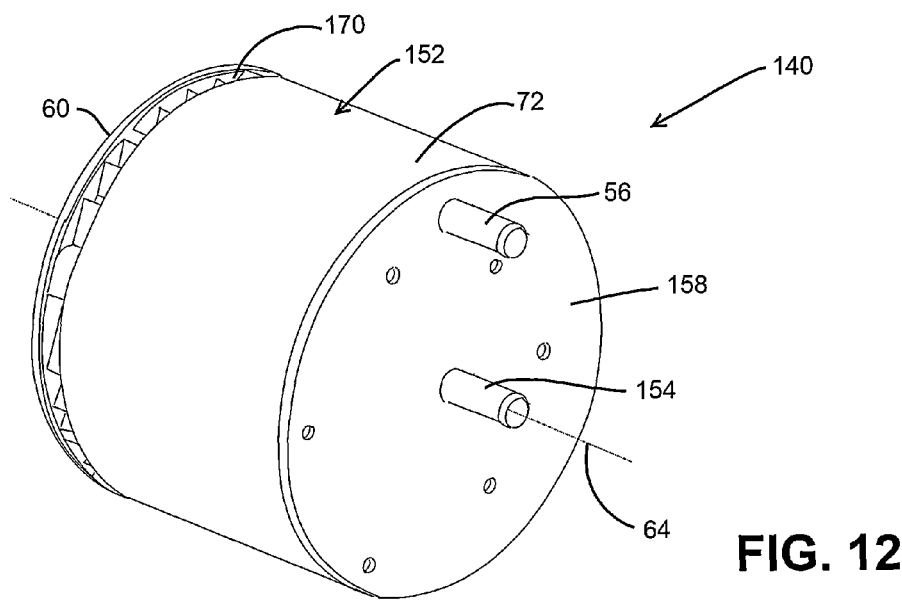
FIG. 12 is a rear perspective view of the second embodiment rotary electric machine.
Figure 13:
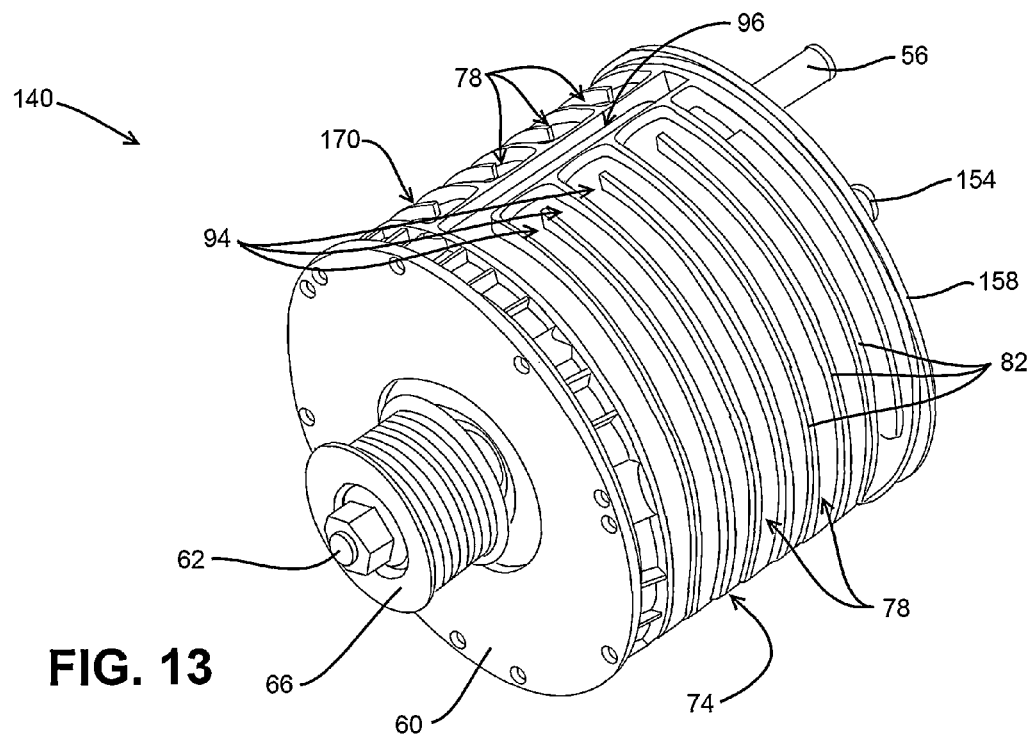
FIG. 13 is a front perspective view of the second embodiment rotary electric machine with its housing sleeve removed.
Figure 14:
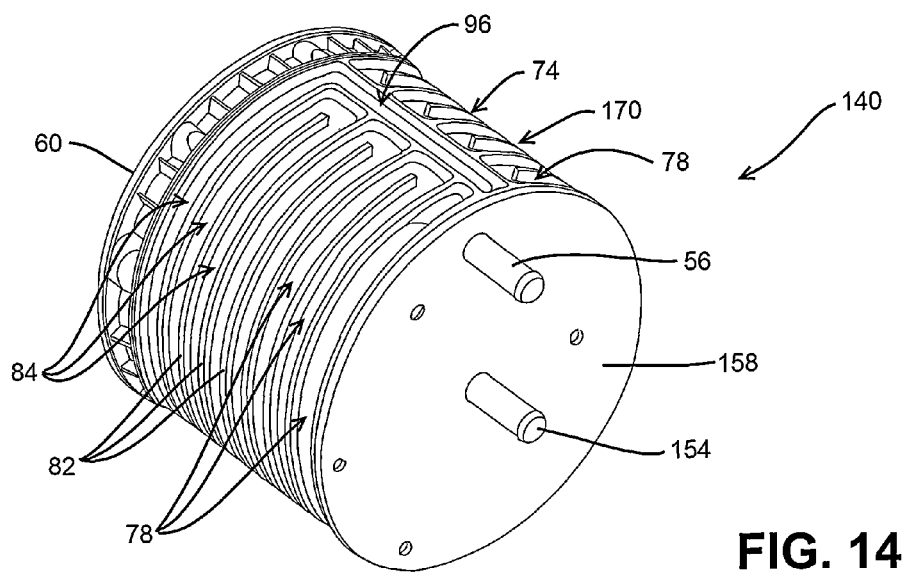
FIG. 14 is a rear perspective view of the second embodiment rotary electric machine with its housing sleeve removed.
Figure 15:
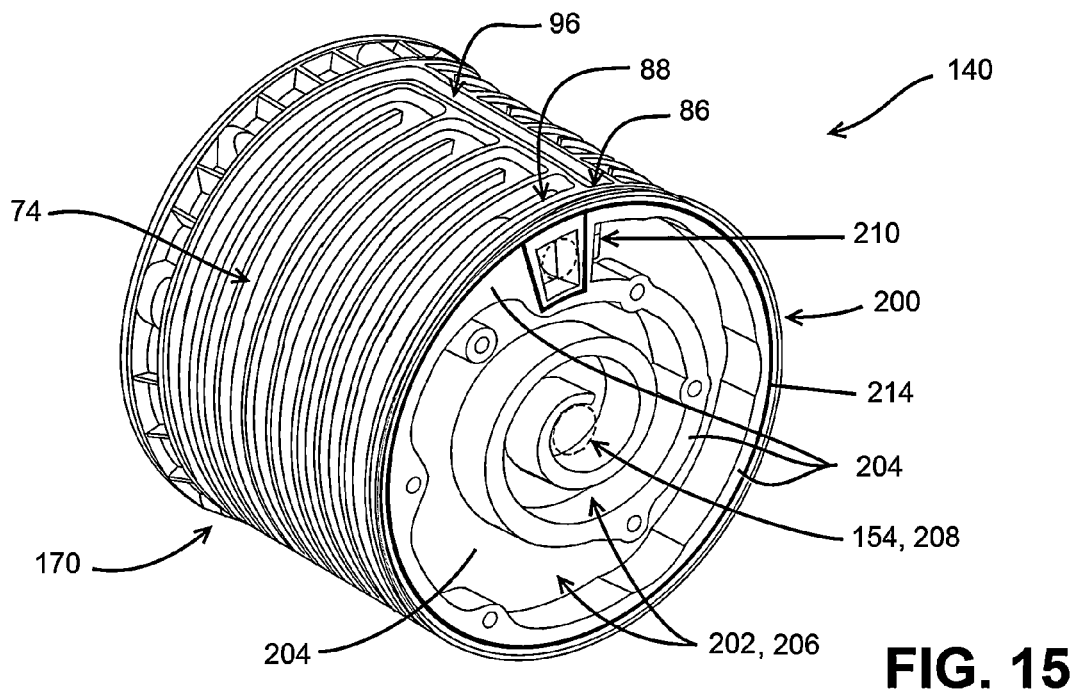
FIG. 15 is a rear perspective view of the second embodiment rotary electric machine with its housing sleeve and rear cover removed.
Figure 16:
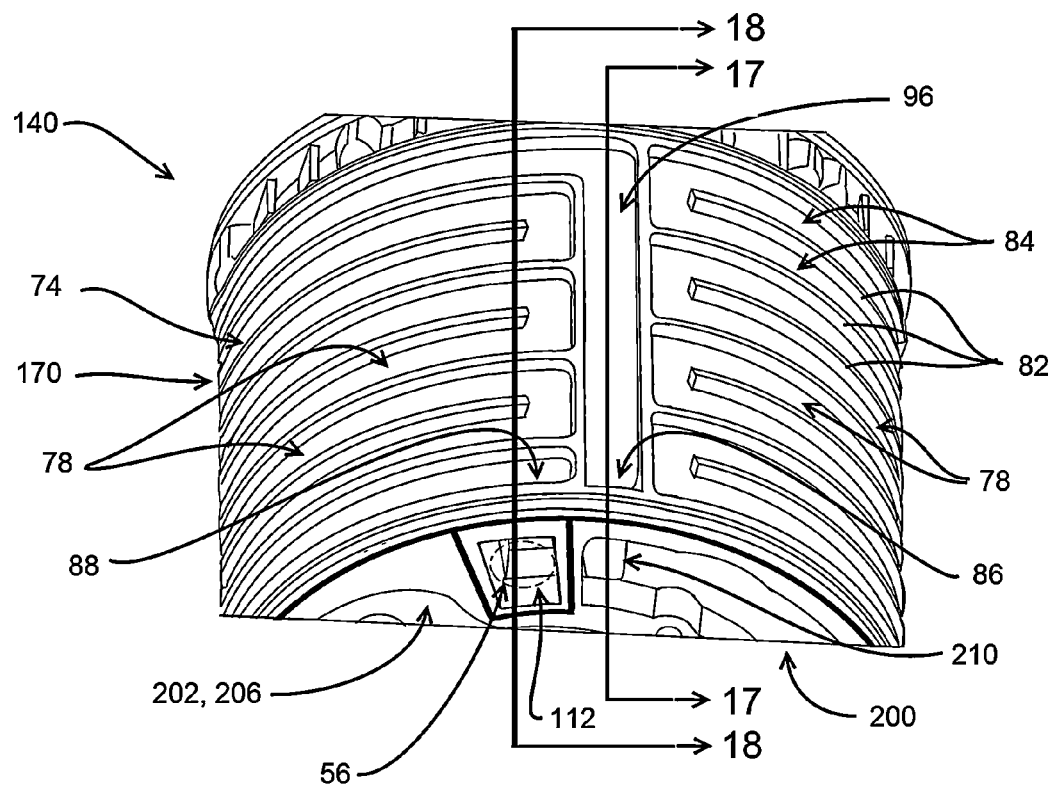
FIG. 16 is a fragmented top perspective view of the second embodiment rotary electric machine with its housing sleeve and rear cover removed.
Figure 17:
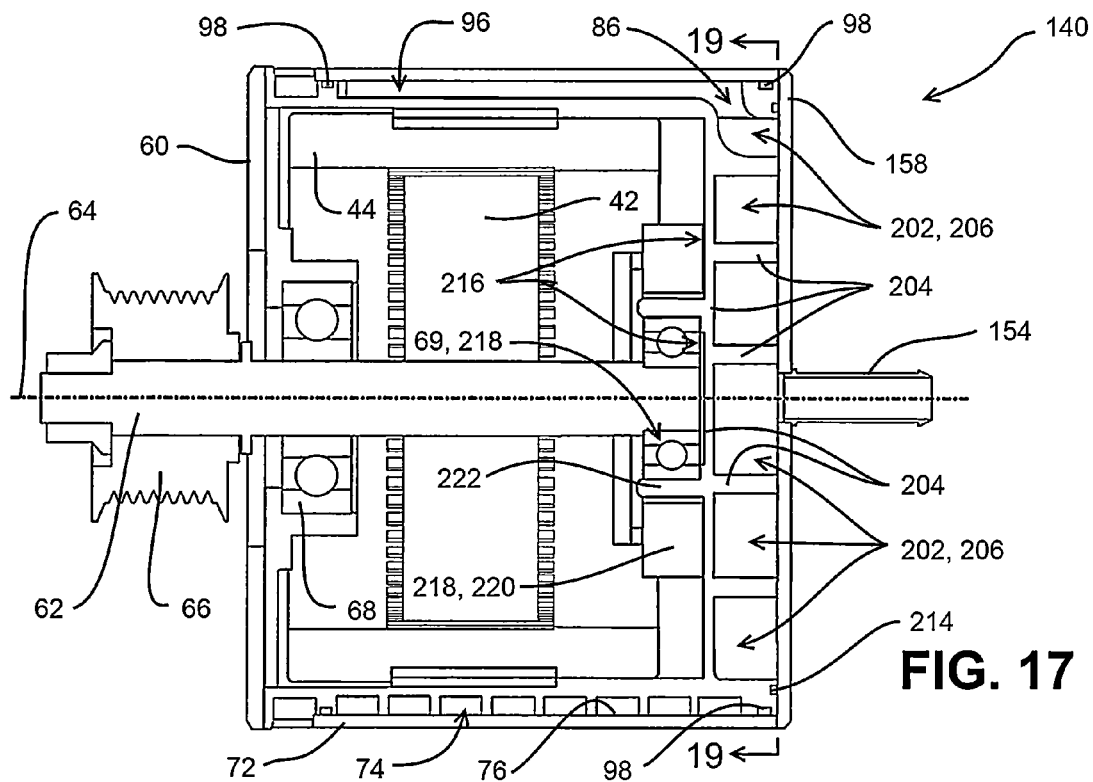
FIG. 17 is a cross-sectional view of the second embodiment rotary electric machine along line 17-17 of FIGS. 16 and 19.
Figure 18:
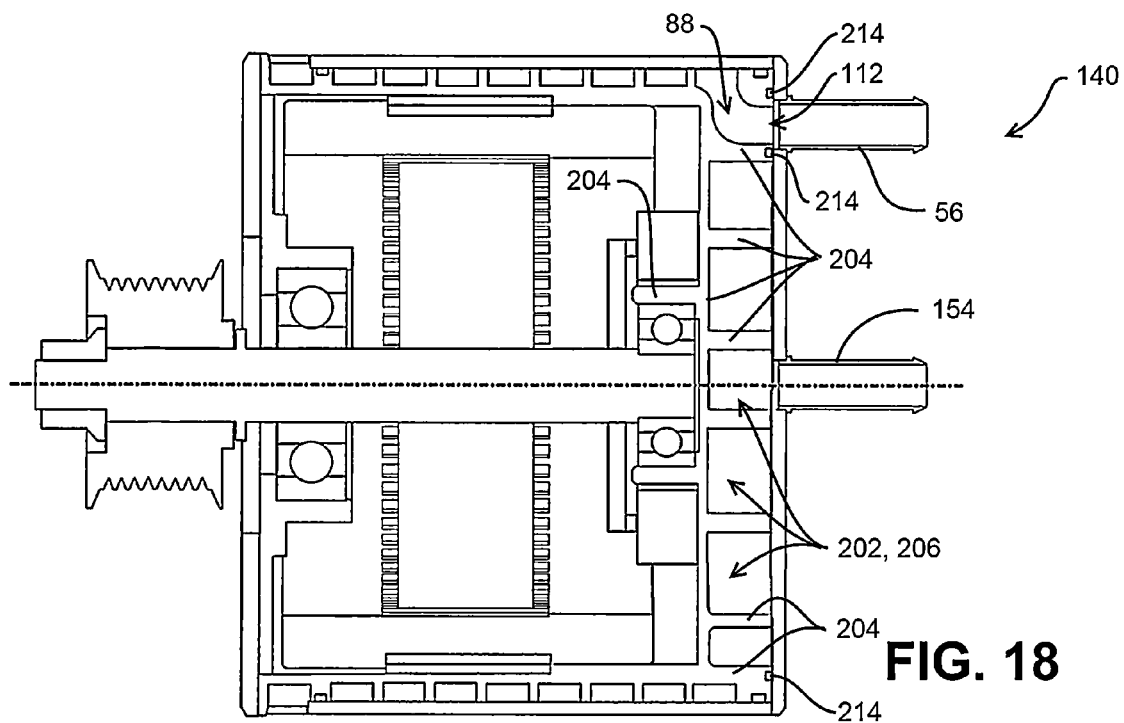
FIG. 18 is a cross-sectional view of the second embodiment rotary electric machine along line 18-18 of FIGS. 16 and 19.

Fitting 154 itself is structurally identical to fitting 54, and is connected to removable rear cover 158 in a manner similar to that of fitting 54 to rear cover 58; rear cover 158 itself is structurally similar to rear cover 58, with the primary difference therebetween being the respective locations of fittings 54 and 154. As best shown in FIGS. 12 and 14, coolant fitting 154 is centrally located on circular cover 158, generally coaxially with central axis 64.

Machine 140 includes generally cylindrical jacket 170 which is in conductive thermal communication with stator 44 and forms part of housing 152. The materials of jacket 170, and its relationship to stator 44, are substantially as described above regarding jacket 70 of first embodiment machine 40. Moreover, jacket 170 and cylindrical sleeve 72 cooperate to define fluid channel 78 as described above in regard to machine 40. Fluid channel 78 defines flow path 180 for liquid coolant through machine 140.

Referring to FIGS. 15-19, generally cylindrical jacket 170 has an interior volume and axial end portion 200 at the rear of machine 140 which encloses the axial end of the jacket interior volume, in which rotor 42 and stator 44 are located. Fluid chamber 202 is defined by walls 204 of jacket axial end portion 200, with fluid chamber 202 being fluidly connected to above-described fluid channel 78 via entry 86. Walls 204 of jacket axial end portion 200 and cover 158 form a generally spiral-shaped fluid passage 206 that extends between first and second openings 208, 210. First opening 208 is located at the axially inward end of first coolant fitting 154 which is the coolant inlet to machine 140. Liquid coolant received into fluid chamber 202 via first coolant fitting 154 is directed about and outwardly of central axis 64 along flow path 180 through serpentine passage 206, to second opening 210. As clearly shown in FIG. 19, along fluid passage 206, flow path 180 is generally spiral-shaped and extends about central axis 64 (FIG. 12) with changing radial distance therefrom between first opening 208 and second opening 210. Second opening 210 is fluidly connected to entry 86 of fluid distribution channel 78. Like jacket axial end portion 100 of machine 40, jacket axial end portion 200 is provided with port 112 that is fluidly connected to exit 88 of fluid channel 78. Port 112 is fluidly isolated from fluid chamber 202 by gasket or seal 214, which also seals the joint between jacket 170 and removable rear cover 158 to prevent liquid coolant leakage from fluid chamber 202.

Jacket axial end portion 200 is provided with generally planar, axially inner surface 216 formed by jacket axial end portion walls 204. Surface 216 and fluid chamber 202 are in conductive thermal communication through wall 204 separating them. Placed against surface 216, and in conductive thermal communication with wall 204, is a first heat source 218 in the form of power electronics module 220. Power electronics 220 are of a suitable configuration, and a type known in the relevant art for controlling electrical power that induces relative rotation between rotor 42 and stator 44, or for controlling electrical power generated by their relative rotation, as the case may be. Shaft rear bearing 69, supported in bearing mount portion 222 defined by walls 204 of jacket axial end portion 200, is another heat source 218 of machine 140.

Heat transferrable from heat source(s) 218 through jacket axial end portion wall(s) 204 is convectively transferrable to liquid coolant along flow path 180 within the fluid passage 206. Thus, heat from stator 44 and from additional heat source(s) 218 (e.g., power electronics module 220 and/or rear bearing 69) is convectively transferrable to liquid coolant along flow path 180 via the cylindrical wall of jacket 170 and jacket axial end portion 200.

Figure 19:
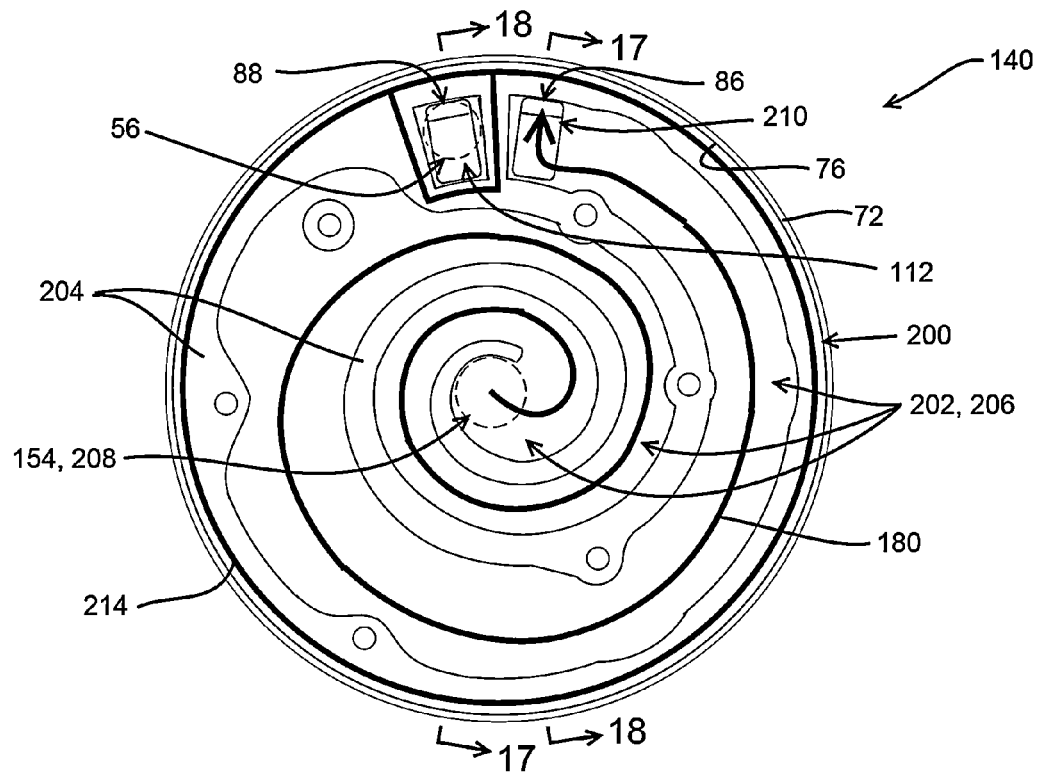
FIG. 19 is a rear end view of the second embodiment rotary electric machine without its rear cover, taken along line 19-19 of FIG. 17.
Figure 20:
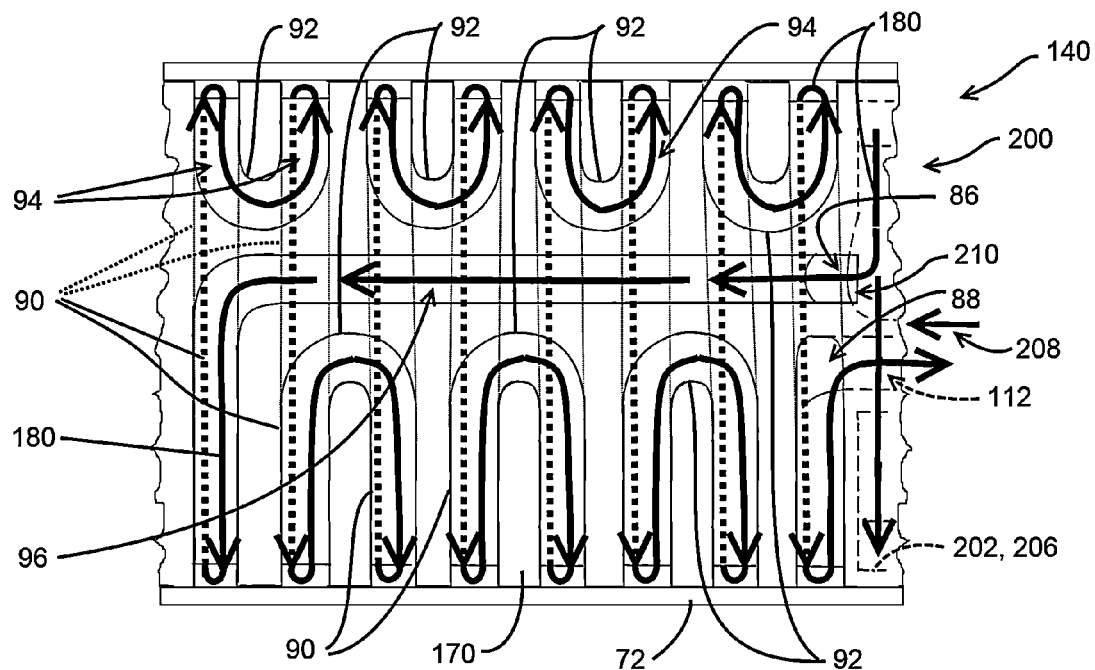
FIG. 20 is a fragmented, partially cross-sectioned top view of the second embodiment rotary electric machine showing the flow path for liquid coolant therethrough.
Figure 21:
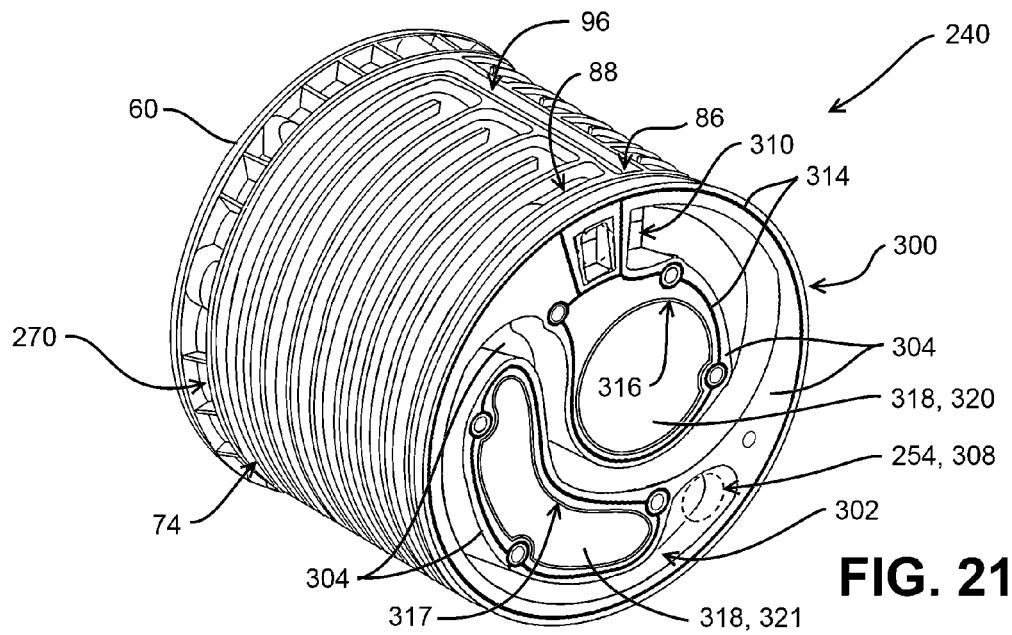
FIG. 21 is a rear perspective view of a third embodiment rotary electric machine according to the present disclosure, with its housing sleeve and rear cover removed.
Figure 22:
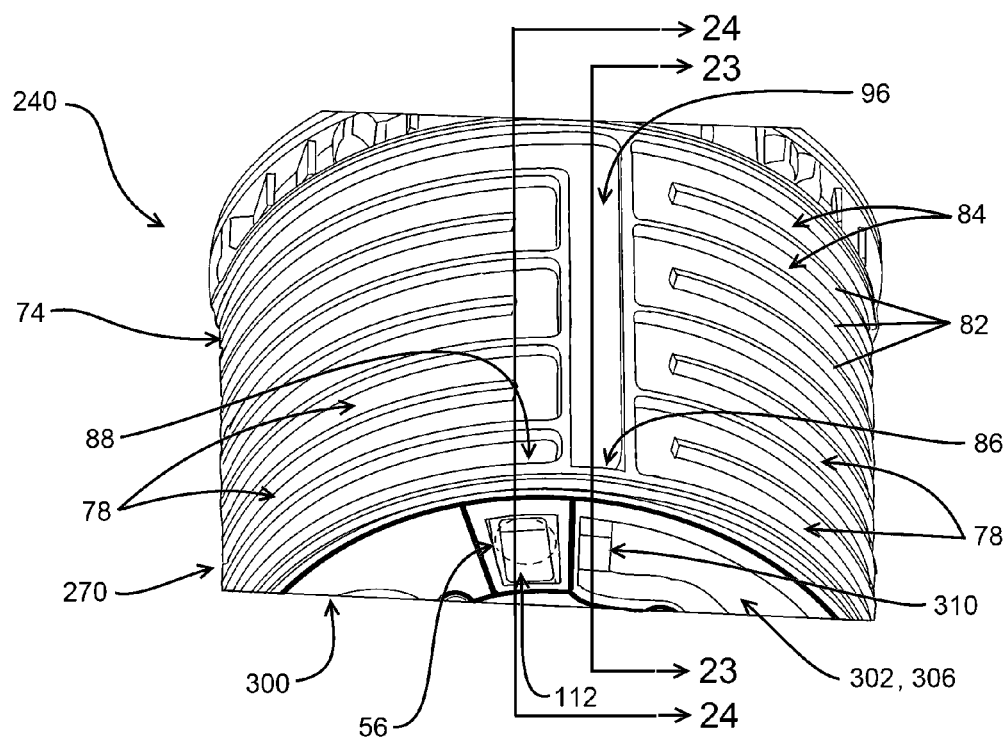
FIG. 22 is a fragmented top perspective view of the third embodiment rotary electric machine with its housing sleeve and rear cover removed.
Figure 23:
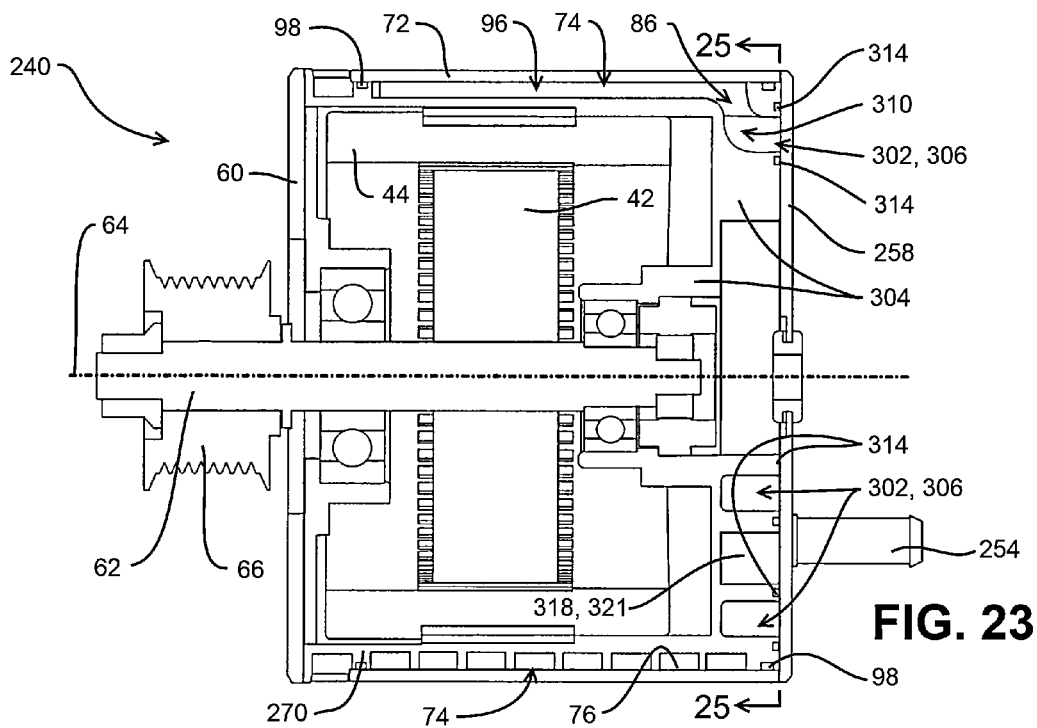
FIG. 23 is a cross-sectional view of the third embodiment rotary electric machine and along line 23-23 of FIG. 22 and the machine central axis.
Figure 24:
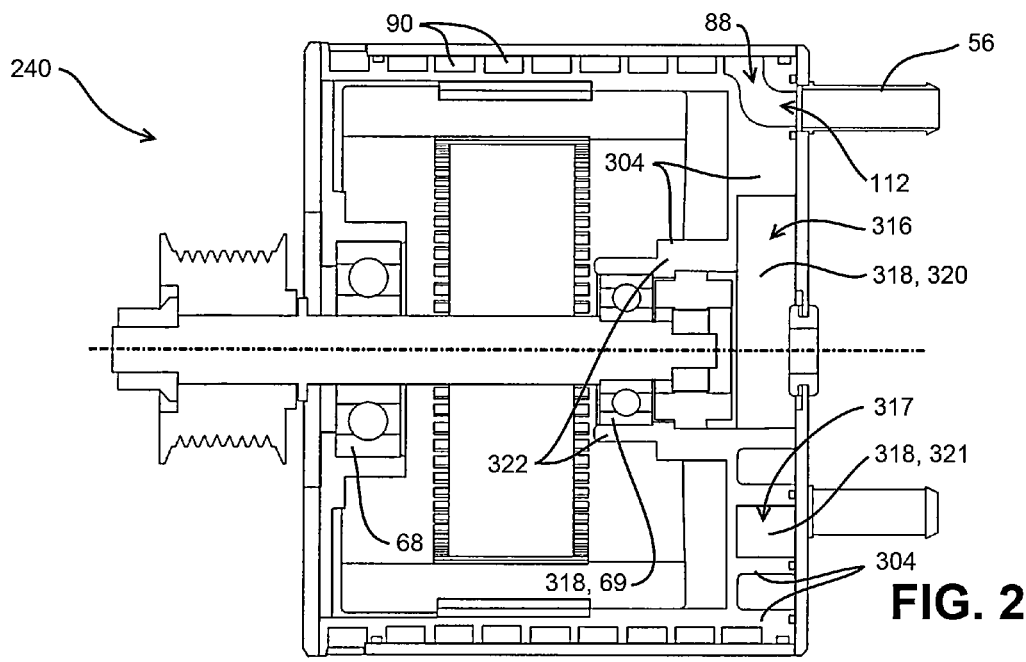
FIG. 24 is a cross-sectional view of the third embodiment rotary electric machine and along line 24-24 of FIG. 22 and the machine central axis.

From the drawings and the above description, it can be understood that flow path 180 for liquid coolant through machine 140 begins at first coolant fitting 154, extends along spiral-shaped fluid passage 206 and through fluid channel 78, and ends at second coolant fitting 56. More particularly, liquid coolant received into machine 140 through coolant inlet 154 is received via first opening 208 into fluid chamber 202, flows about and outwardly of axis 64 through fluid passage 206, enters entry 86 of fluid distribution channel 78 through second opening 210, and continues in a direction along central axis 64 through third fluid channel portion 96 to connected inlet end 94 of the first fluid channel portion 90 that is located nearest front cover 60, as in first embodiment machine 40. Liquid coolant in that first fluid channel portion 90 flows circumferentially about axis 64, between the interfacing surfaces 74, 76 of jacket 170 and sleeve 72, within a jacket recess 84 bounded by jacket walls 82. As described above, once the liquid coolant reaches the opposite, outlet end 94 of that first fluid channel portion 90, it then continues axially in a direction generally along axis 64 via a second fluid channel portion 92, to the inlet end 94 of the axially adjacent first fluid channel portion 90, along which it flows circumferentially about axis 64 to the opposite, outlet end 94 of that adjacent first fluid channel portion 90, as in first embodiment machine 40. The flow path 180 of liquid coolant continues in this manner through the serially connected first and second portions 90, 92 of fluid channel 78 until reaching exit 88 of fluid channel 78. The coolant flows out of fluid channel 78 through exit 88, and to port 112, from which it flows out of machine 140 through second coolant fitting 56. Referring to FIGS. 19 and 20, the described flow path 180 for liquid coolant through machine 140 is indicated by directional arrows. Alternatively, first opening 208 of fluid chamber 202 may be located in the cylindrical outer wall of jacket 170, with first coolant fitting 154 being fitted thereinto rather than affixed to cover 158 as described above and depicted in the drawings. Also, alternatively, port 112 may be located in the cylindrical outer wall of jacket 170, with second coolant fitting 56 being fitted thereinto rather than affixed to cover 158 as described above and depicted in the drawings. In such alternative, unshown embodiment(s), the coolant inlet and outlet fittings extend radially from machine 140, rather than being carried by and extending axially from cover 158.

FIGS. 21 through 25 show third embodiment rotary electric machine 240 which, other than as shown in the drawings and described herein, is also substantially identical in structure, operation, and function to first embodiment rotary electric machine 40. Features unique to second embodiment machine 240, and which may differ significantly from respective, corresponding features of first embodiment machine 40, are identified by reference numerals representing the sum of 200 plus the reference numeral associated with the respective feature in first embodiment machine 40. The exterior appearance of machine 240 is similar to that of machines 40 and 140, but for the location of the coolant inlet fitting 254 relative to its removable rear cover 258, which are otherwise similar to first coolant fittings 54, 154 and rear covers 58, 158 of machines 40, 140, respectively. The generally cylindrical housing 252 of third embodiment machine 240 also includes a coolant outlet 56. As discussed above in connection with first and second embodiment machines 40, 140, it is to be understood that the first and second coolant fittings 254, 56 of third embodiment machine 240 fluidly connect machine 240 to the remainder of a liquid cooling circuit, and may be reversed, with a consequent reversal of the direction of liquid coolant flow through the machine. Characterizations such as inlet, outlet, entry, and/or exit, relating to the direction of coolant flow along the liquid coolant flow path, would likewise be reversed.

Generally cylindrical jacket 270 of machine 240 forms part of housing 252, and is similar to jacket 70 of first embodiment machine 40. Jacket 270 is in conductive thermal communication with stator 44 and cooperates with cylindrical sleeve 72 to define fluid channel 78 therebetween as described above in regard to machines 40 and 140. Fluid channel 78 defines flow path 280 for liquid coolant through machine 240.

Generally cylindrical jacket 270 has an interior volume and axial end portion 300, at the rear of machine 240, which partially encloses the axial end of the jacket interior volume, in which rotor 42 and stator 44 are located. Fluid chamber 302 is defined by walls 304 of jacket axial end portion 300, with fluid chamber 302 being fluidly connected to above-described fluid channel 78 via entry 86. Walls 304 and removable rear cover 258 form substantially S-shaped fluid passage 306 that extends between first and second openings 308, 310. First opening 308 is located at the axially inward end of first coolant fitting 254 which is the coolant inlet to machine 240. Liquid coolant received into fluid chamber 302 via first coolant fitting 254 is directed along serpentine flow path 280 through fluid passage 306, to second opening 310. Second opening 310 is fluidly connected to entry 86 of fluid distribution channel 78. Like jacket axial end portion 100 of machine 40, jacket axial end portion 300 is provided with port 112 that is fluidly connected to exit 88 of fluid channel 78. Port 112 is fluidly isolated from fluid chamber 302 by gasket or seal 314, which also seals the joint between jacket 270 and removable rear cover 258 to prevent liquid coolant leakage from fluid chamber 302.

First and second cavities 316, 317 are defined by walls 304 of jacket axial end portion 300, and each cavity is substantially surrounded by a portion of S-shaped fluid chamber 302, which extends between cavities 316, 317 and separates them from each other. Each respective cavity 316, 317, and chamber 302, are in conductive thermal communication through wall 304 separating them. Disposed within first cavity 316, and in conductive thermal communication with its defining wall 304, is a heat source 318 in the form of first power electronics module 320. Disposed within second cavity 317, and in conductive thermal communication with its defining wall 304, is another heat source 318 in the form of second power electronics module 321. Each power electronics module 320, 321 is of a suitable configuration and of a type well known in the relevant art for controlling electrical power that induces relative rotation between rotor 42 and stator 44, or for controlling electrical power generated by their relative rotation, as the case may be. The S-shaped pattern of fluid passage 306 allows for each module 320, 321 to have liquid coolant pass on three sides thereof, maximizing heat rejection from the modules by allowing maximum coolant contact with walls 304 for a given heat source package size. Moreover, shaft rear bearing 69, supported in bearing mount portion 322 defined by walls 304 of jacket axial end portion 300, may also act as a heat source 318 during operation of machine 240.

Heat transferrable from heat source(s) 318 through jacket axial end portion walls 304 is convectively transferrable to liquid coolant along flow path 280 within the fluid passage 306. Thus, heat from stator 44 and from additional heat sources 318 (e.g., power electronics modules 320, 321 and/or rear bearing 69) is convectively transferrable to liquid coolant along flow path 280 via the cylindrical wall of jacket 270 and jacket axial end portion 300.

Figure 25:
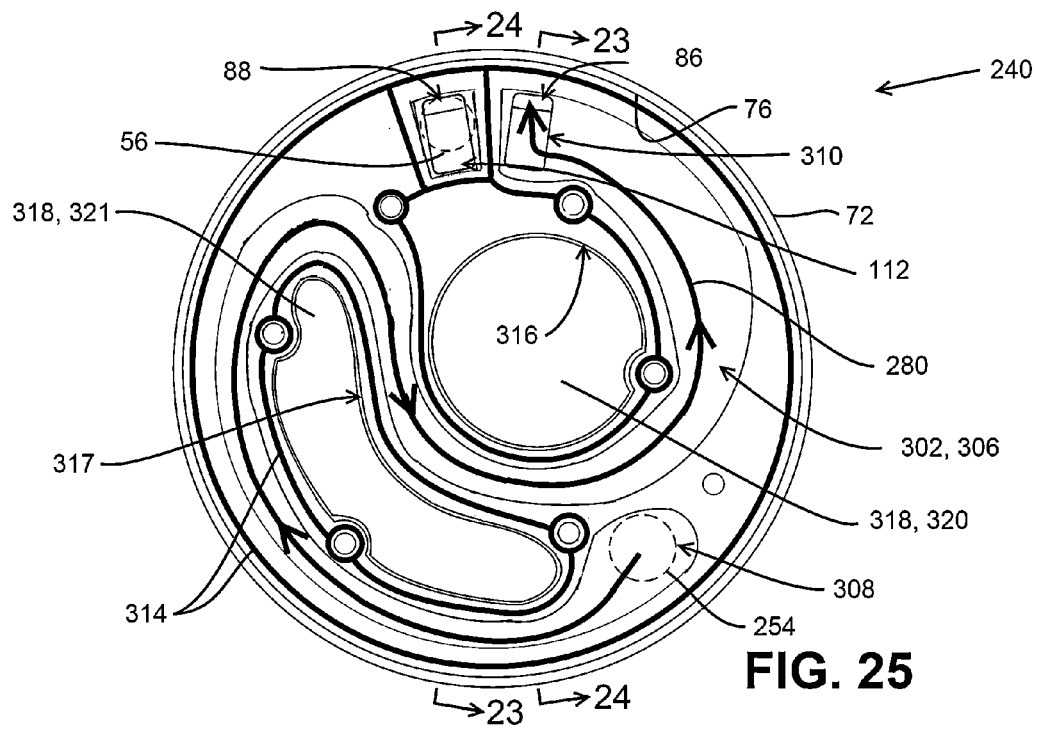
FIG. 25 is a rear end view of the third embodiment rotary electric machine without its rear cover, taken along line 25-25 of FIG. 23.

From the drawings and the above description, it can be understood that flow path 280 for liquid coolant through machine 240 begins at first coolant fitting 254, extends along S-shaped fluid passage 306 and through fluid channel 78, and ends at second coolant fitting 56. More particularly, liquid coolant received into machine 240 through coolant inlet 254 is received via first opening 308 into fluid chamber 302, flows along serpentine fluid passage 306 which extends circumferentially about and substantially surrounds each of cavities 316, 317, and enters entry 86 of fluid channel 78 through second opening 310. Within fluid channel 78, the coolant continues in a direction along central axis 64 through third fluid channel portion 96 to fluidly connected inlet end 94 of the first fluid channel portion 90 located nearest front cover 60, as in first and second embodiment machines 40, 140. Liquid coolant in that first fluid channel portion 90 flows circumferentially about axis 64, between the interfacing surfaces 74, 76 of jacket 270 and sleeve 72, within a jacket recess 84 bounded by jacket walls 82. Once the liquid coolant reaches the opposite, outlet end 94 of that first fluid channel portion 90, it then continues axially in a direction generally along axis 64 via a second fluid channel portion 92, to the inlet end 94 of the axially adjacent first fluid channel portion 90, along which it flows circumferentially about axis 64 to the opposite, outlet end 94 of that adjacent first fluid channel portion 90, as in first and second embodiment machines 40, 140. The flow path 280 of liquid coolant continues in this manner through the serially connected first and second portions 90, 92 of fluid channel 78, through exit 88 of fluid channel 78, to port 112, and out of machine 240 through second coolant fitting 56. Referring to FIG. 25, the described flow path 280 for liquid coolant through machine 240 is indicated by directional arrows. Alternatively, first opening 308 of fluid chamber 302 may be located in the cylindrical outer wall of jacket 270, with first coolant fitting 254 being fitted thereinto rather than affixed to cover 258 as described above and depicted in the drawings. Also, alternatively, port 112 may be located in the cylindrical outer wall of jacket 170, with second coolant fitting 56 being fitted thereinto rather than affixed to cover 258 as described above and depicted in the drawings. In such alternative, unshown embodiment(s), the coolant inlet and outlet fittings extend radially from machine 240, rather than being carried by and extending axially from cover 258.

Figure 26:
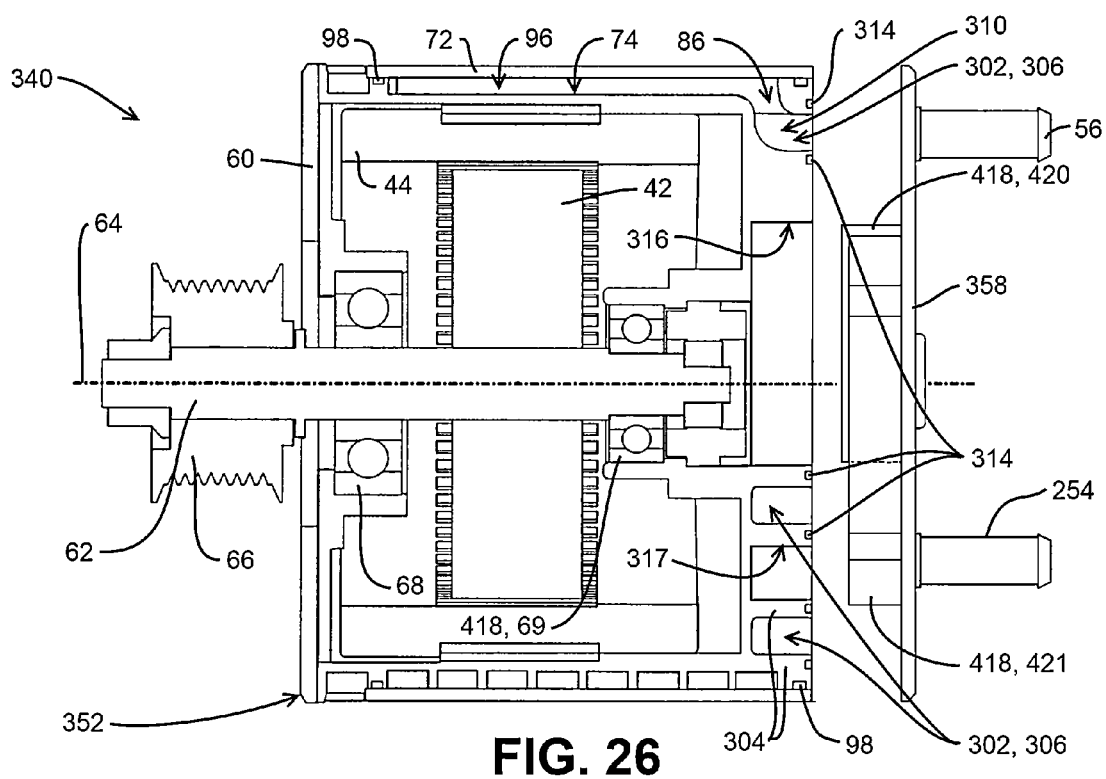
FIG. 26 is an exploded, partially cross-sectioned side view of a fourth embodiment rotary electric machine according to the present disclosure.

FIG. 26 shows a portion of a fourth embodiment rotary electric machine 340 that is similar to third embodiment machine 240, including alternative, unshown variations thereof in which the coolant inlet and outlet fittings extend radially from the jacket cylindrical wall. In machine 340, however, first and second power electronics modules 420, 421, which are similar to power electronics modules 320, 321 of second embodiment machine 240, are heat sources 418 which are mounted to its removable rear cover 358. Rear cover 358 of machine 340, a component of its housing 352, is otherwise similar to rear cover 258 of machine 240. Power electronics 420, 421 are received into cavities 316, 317 of jacket 270, and these heat sources 418 are in conductive thermal communication with walls 304 of jacket axial end portion 300, as in third embodiment machine 240. Rear bearing 69 is another heat source 418 of machine 340. In view of the disclosure of fourth embodiment machine 340, rotary electric machine embodiments (not shown) similar to other machines disclosed herein but having heat sources mounted to their rear covers, may be easily envisioned.

Figure 27:
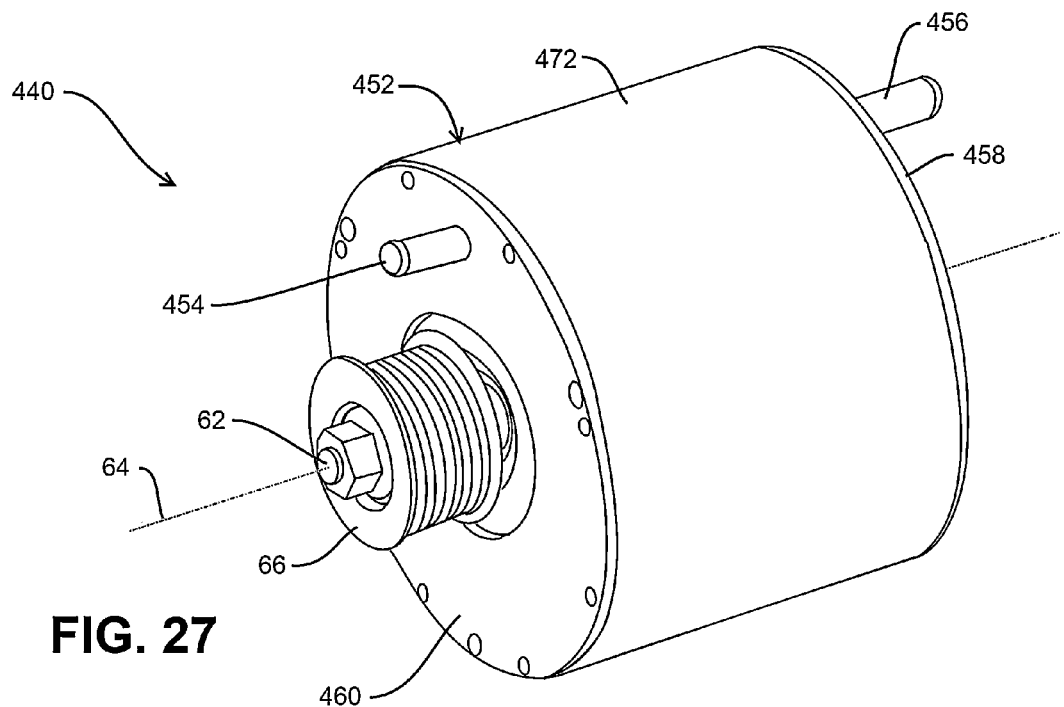
FIG. 27 is a front perspective view of a fifth embodiment of a rotary electric machine according to the present disclosure.
Figure 28:
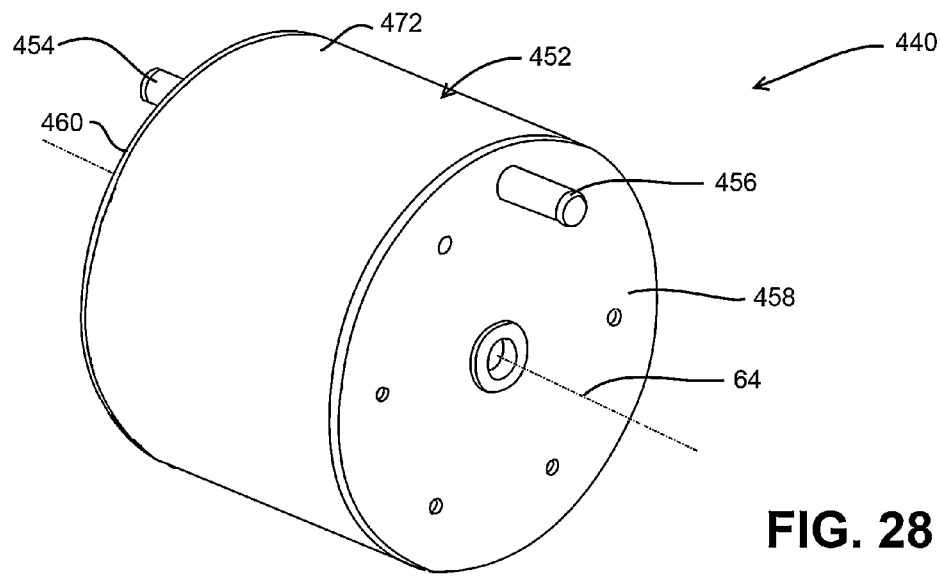
FIG. 28 is a rear perspective view of the fifth embodiment rotary electric machine.
Figure 29:
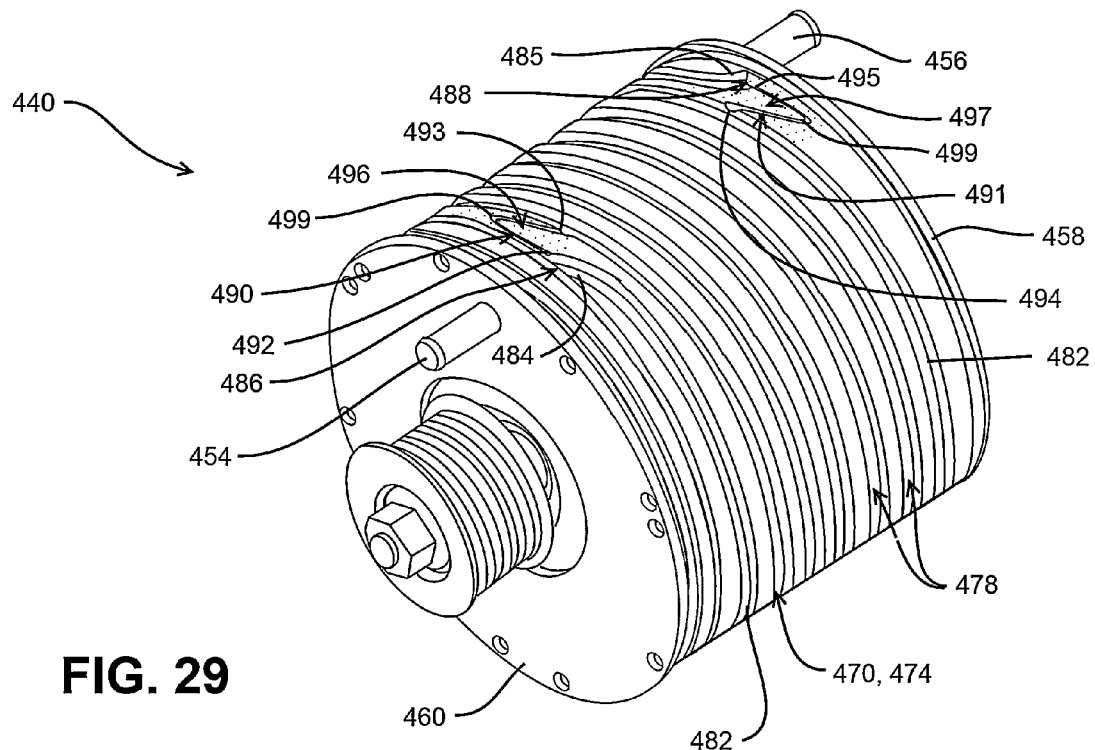
FIG. 29 is a front perspective view of the fifth embodiment rotary electric machine with its housing sleeve removed.
Figure 30:
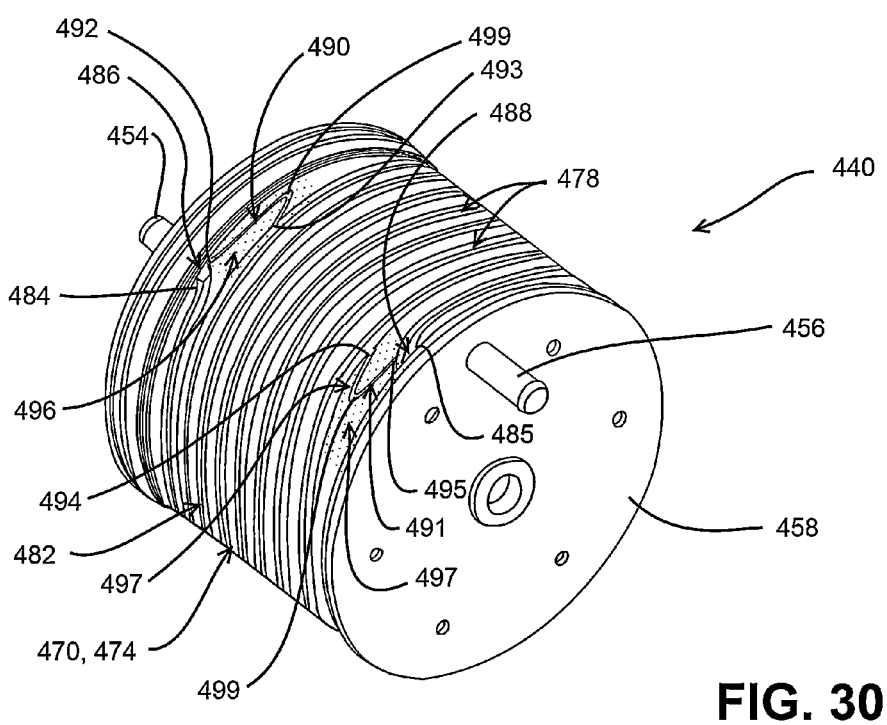
FIG. 30 is a rear perspective view of the fifth embodiment rotary electric machine with its housing sleeve removed.
Figure 31:
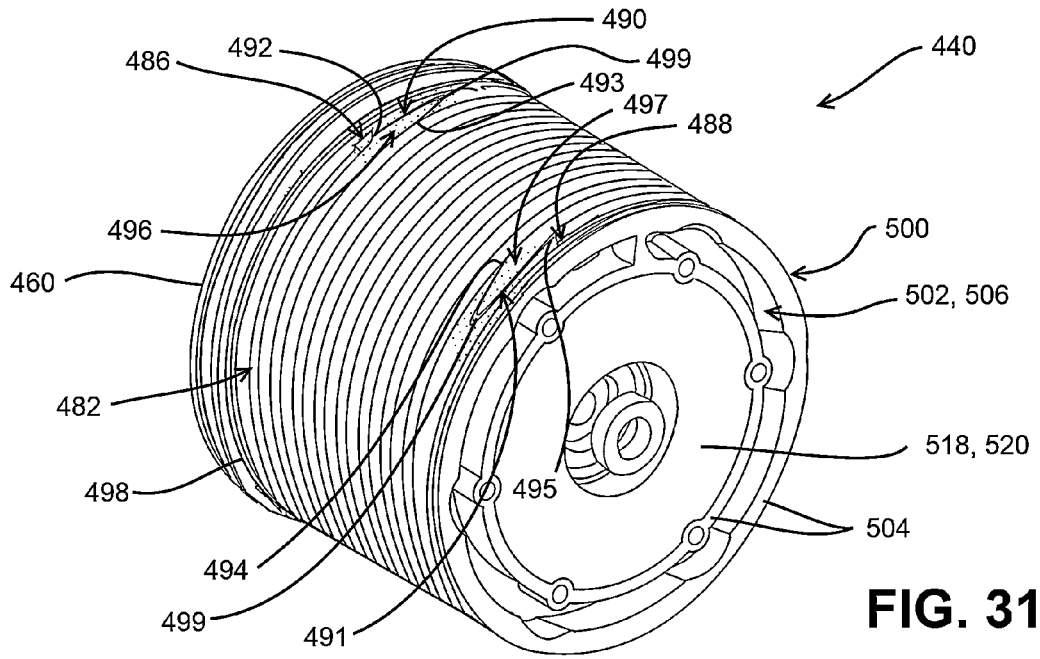
FIG. 31 is a rear perspective view of the fifth embodiment rotary electric machine with its housing sleeve and rear cover removed.
Figure 32:
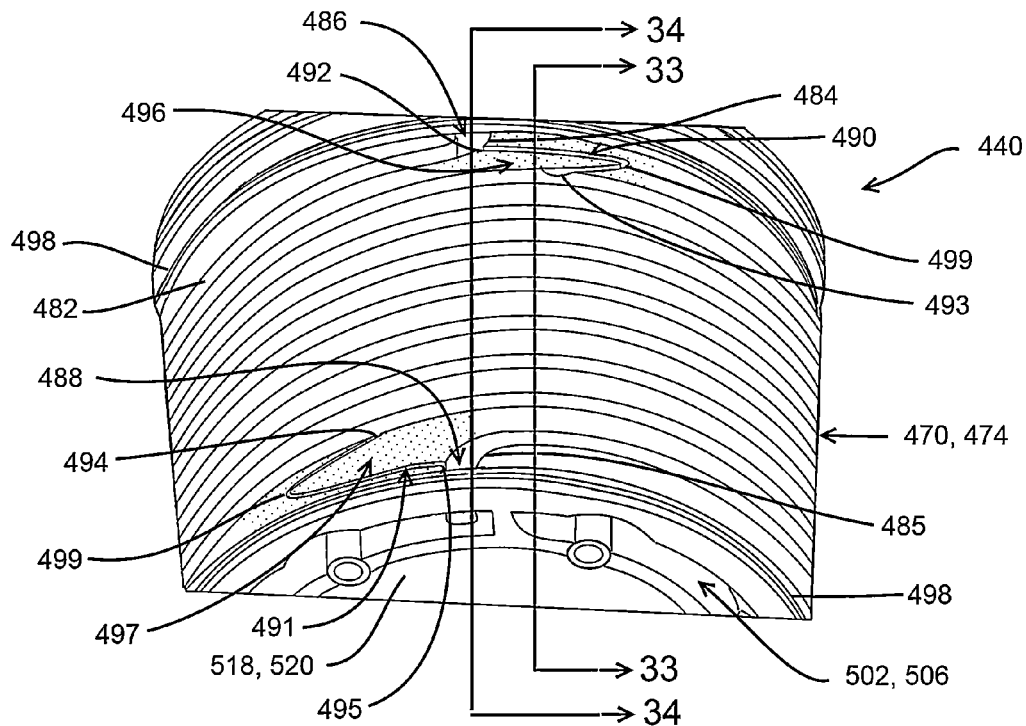
FIG. 32 is a fragmented top perspective view of the fifth embodiment rotary electric machine with its housing sleeve and rear cover removed.

FIGS. 27 through 36 show fifth embodiment rotary electric machine 440. Machine 440 includes rotor 42 and stator 444 (FIGS. 33 and 34) having relative rotation therebetween. Referring to FIGS. 27 and 28, machine 440 has generally cylindrical housing 452 provided with first coolant fitting 454 and second coolant fitting 456. As shown, liquid coolant is received into housing 452 via first coolant fitting 454, which is a coolant inlet to machine 440; liquid coolant is expelled from housing 452 via second coolant fitting 456, which is a coolant outlet from machine 440. As with the above-described embodiments, it is to be understood that fittings 454 and 456 may be reversed with regard to their serving as the coolant inlet to and outlet from machine 440, with a consequent reversal of the direction of liquid coolant flow through the machine, and that characterizations such as inlet, outlet, entry, and/or exit, relating to the direction of coolant flow along the liquid coolant flow path, would consequently be similarly reversed.

Typically, as with the above-described embodiments, machine 440 is part of a closed-loop coolant system of a well-known type that includes a liquid pump and a heat exchanger (not shown). With regard to the depicted embodiment, once it is installed and operative, inlet fitting 454 is provided with pressurized liquid coolant from a supply external to rotary electric machine 440, as by a coolant supply hose (not shown) clamped or otherwise securely connected thereto. Outlet fitting 456 is similarly connected to a coolant return hose (not shown) that conveys coolant expelled from machine 440, which is subsequently cooled.

Figure 33:
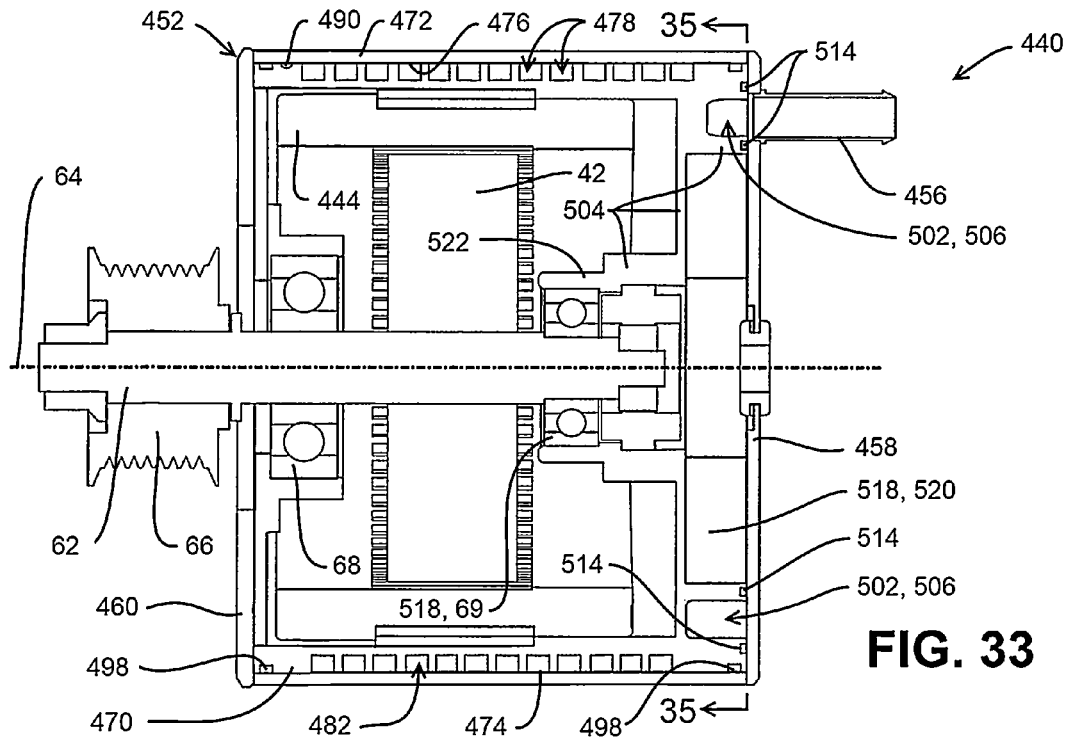
FIG. 33 is a cross-sectional view of the fifth embodiment rotary electric machine along line 33-33 of FIGS. 32 and 35.
Figure 34:
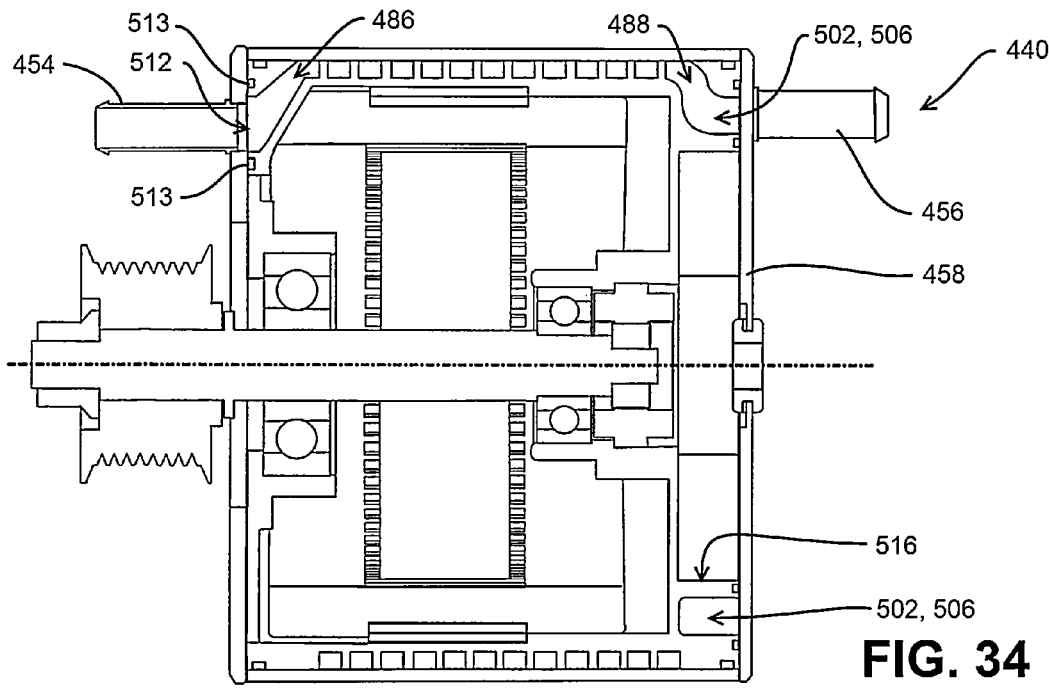
FIG. 34 is a cross-sectional view of the fifth embodiment rotary electric machine along line 34-34 of FIGS. 32 and 35.

Fittings 454, 456 may be formed from steel tubing and are respectively affixed to circular, planar front cover 460 and rear cover 458 that form opposite, front and rear axial ends of cylindrical housing 452. Covers 458, 460 are rigid, and may be formed from steel plate material having apertures into which the axially inward ends of fittings 456, 454 are inserted and attached, as by brazing, for example. Front cover 460 is also provided with a central aperture through which extends shaft 62, which is rotatable about central axis 64 and rotatably fixed to rotor 42. Pulley 66 is rotatably fixed to shaft 62 externally of housing 452. Internally of housing 452, shaft 62 is supported by front and rear bearings 68, 69, as shown in FIGS. 33 and 34.

Machine 440 includes a generally cylindrical jacket 470 which is in conductive thermal communication with stator 444 and forms part of housing 452. Jacket 470 is preferably cast of a highly thermally conductive, rigid material such as, for example, aluminum, but may alternatively be ferrous, and/or a stamping or a weldment. Disposed radially about jacket 470 is tubular, cylindrical sleeve 472, which may be formed of metallic or plastic sheet material, for example. Jacket 470 has generally cylindrical, radially outer heat transfer surface 474, and tubular sleeve 472 has interfacing, cylindrical, radially inner containment surface 476. Between radially outer heat transfer surface 474 and radially inner containment surface 476 is fluid channel 478 which defines flow path 480 for liquid coolant through machine 440. In other words, fluid channel 478 is located axially between the opposite ends of tubular sleeve 472, and in spaces radially between superposed outer and inner surfaces 474 and 476. At least a portion of flow path 480 for liquid coolant through machine 440 follows fluid channel 478.

Jacket 470 and sleeve 472 may, for example, be interference or thermally fitted together in a known manner, as by cooling jacket 470 and heating sleeve 472 prior to their assembly, and then allowing their temperatures to equalize after being positioned relative to each other. Moreover, those of ordinary skill in the art will recognize that, instead of being structured as shown, jacket radially outer heat transfer surface 474 may be substantially featureless, while sleeve radially inner containment surface 476 is provided with fluid channel-defining features. Referring to FIGS. 33 and 34, seals 498 are provided between jacket 470 and sleeve 472 at their opposite axial ends.

Generally cylindrical radially outer heat transfer surface 474 of jacket 470 is provided with continuous, helical groove 482 which extends circumferentially about, and progresses axially in a direction along, axis 64 at a uniform pitch and defines fluid channel 478. As shown, the cross section of helical groove 482 may be substantially rectangular and generally uniform in shape, but may be altered along flow path 480 to affect coolant flow and/or heat transfer conditions as desired. Portions of radially outer heat transfer surface 474 outside of helical groove 482 are in contact with cylindrical, smooth, radially inner containment surface 476 of sleeve 472, which is substantially featureless. Portions of fluid channel 478 are thus located radially between sleeve inner containment surface 476 and the floor of groove 482.

In machine 440, helical groove 482 defines a primary or first portion of fluid channel 478 that extends circumferentially about axis 64 and simultaneously progresses in a direction along axis 64. About and along axis 64, the simultaneous circumferential extension and axial progression of fluid channel 478 as defined by helical groove 482 are inter-dependent. In other words, in machine 440, flow path 480 as defined by fluid channel 478 progresses in a direction along central axis 64 dependently of flow path 480 extending substantially circumferentially about axis 64.

At opposite ends 484, 485 of helical groove 482, at locations along flow path 480, are entry 486 and exit 488 of fluid channel 478, respectively. Entry 486 and exit 488 each extend through jacket 470 radially inward of the sealed joints between jacket 470 and sleeve 472. As discussed above, the designations of entry 486 and exit 488 as such may be reversed depending on the chosen direction of coolant flow along flow path 480 through machine 440. In an alternative, unshown embodiment of machine 440, fittings 454 and 456 are located at opposite ends of helical groove 482, are affixed into apertures provided in cylindrical sleeve 472, and define fluid channel entry 486 and fluid channel exit 488, respectively. In such an alternative embodiment, fittings 454 and 456 extend radially from machine 440, rather than being carried by and extending axially from covers 460 and 458, as described above and depicted in the drawings.

Prior liquid-cooled rotary electric machines are known which include a generally cylindrical heat transfer surface having a helical groove, similar to groove 482, that defines a helical fluid channel. Depending upon the size and pitch of the groove defining such a helical fluid channel, regions of the heat transfer surface in these prior machines can exist where minimal cooling activity occurs as these regions, relative to the remainder of the heat transfer surface, are not traversed by the fluid channel and therefore are not convectively cooled. Such regions may be sites of locally excessive heat.

To address this shortcoming of prior liquid-cooled rotary electric machines, fluid channel 478 of machine 440 also includes a pair of auxiliary coolant grooves 490, 491 in heat transfer surface 474. Auxiliary coolant grooves 490, 491 define secondary portions of fluid channel 478, and liquid coolant flow path 480 through machine 440. As shown, each auxiliary coolant groove 490, 491 is substantially semi-circular in shape, and is of substantially uniform size along its length; these features may be altered as desired to affect coolant flow therealong and heat transfer from the relevant region or zone. The cross sectional size of the secondary fluid channel portions defined by auxiliary coolant grooves 490, 491 is substantially less than that of the primary fluid channel portion defined by helical groove 482. The flow rate of liquid coolant through the auxiliary coolant grooves 490, 491 is therefore substantially less than the flow rate of liquid coolant through helical groove 482.

Relative to the direction of coolant flow along flow path 480, first-encountered auxiliary coolant groove 490 extends between first 492 and second 493 locations that are spaced along helical groove 482. In the depicted embodiment, first and second locations 492, 493 are spaced circumferentially approximately 360° about axis 64. Thus, first location 492 and second location 493 may be approximately radially aligned about axis 64 as depicted. Locations 492, 493 are also spaced axially approximately the length of the uniform pitch of helical groove 482. First location 492 is located near end 484 of helical groove 482, adjacent to fluid channel entry 486. Second location 493 is located axially inward of first location 492, i.e., in the direction along axis 64 away from entry 486 and towards exit 488. Thus, near its end 484, helical groove 482 is fluidly connected, via auxiliary coolant groove 490, to an axially inward part of itself. The site of axially inward second location 493 is near the point at which helical groove 482 completes its first circumferential extension about central axis 64 in heat transfer surface 474, in the direction of coolant flow along helical groove 482. Thus, at first location 492, helical groove/fluid channel primary portion 482 is fluidly connected, via fluid channel secondary portion 490, to itself at second location 493.

Similarly, second-encountered auxiliary coolant groove 491 extends between third 494 and fourth 495 locations that are spaced along helical groove 482. In the depicted embodiment, third and fourth locations 494, 495 are spaced circumferentially approximately 360° about axis 64. Thus, third location 494 and fourth location 495 may be approximately radially aligned about axis 64 as depicted. Locations 494, 495 are also spaced axially approximately the length of the uniform pitch of helical groove 482. Fourth location 495 is located near end 485 of helical groove 482, adjacent to fluid channel exit 488. Third location 494 is located axially inward of fourth location 495, i.e., in the direction along axis 64 away from exit 488 and towards entry 486. Thus, near its end 485, helical groove 482 is fluidly connected, via auxiliary coolant groove 491, to an axially inward part of itself. The site of axially inward third location 494 is near the point at which helical groove 482 begins its last circumferential extension about central axis 64 in heat transfer surface 474, in the direction of coolant flow along helical groove 482. Thus, at third location 494, helical groove/fluid channel primary portion 482 is fluidly connected, via fluid channel secondary portion 491, to itself at fourth location 495.

Figure 36:
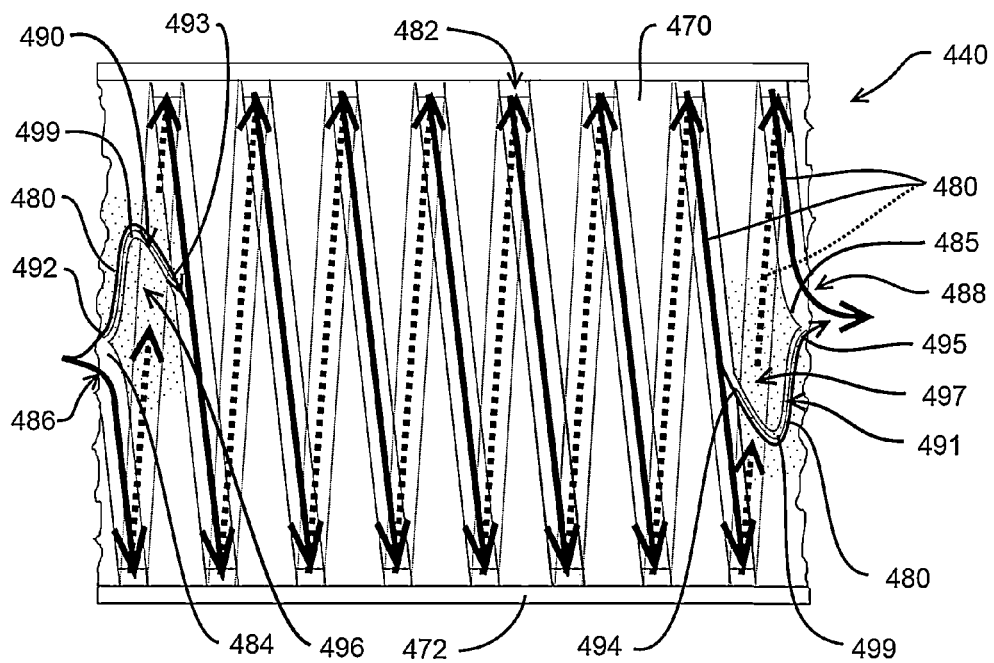
FIG. 36 is a fragmented, partially cross-sectioned top view of the fifth embodiment rotary electric machine showing the flow path for liquid coolant therethrough.

Each auxiliary coolant groove/fluid channel secondary portion 490, 491 extends between its respective pair of locations 492, 493 or 494, 495 and traverses a region or zone 496, 497 of heat transfer surface 474 through which larger-sized helical groove 482 does not extend. If not for the provision of auxiliary coolant groove 490, 491, zones 496, 497 might otherwise be inadequately cooled and a site of undesirable, excessive heating. Zones 496 and 497 are approximately represented by the shaded regions of FIGS. 29-32 and 36. As best seen in FIG. 36, the shapes of the two auxiliary coolant grooves 490 and 491 are substantially mirror images of each other, and they may be otherwise substantially identical. As depicted, each auxiliary coolant groove 490, 491 is curved, and extends well into its respective zone 496, 497.

Referring to the left-hand side of FIG. 36, liquid coolant is received under pressure into entry 486 of fluid channel 478. Proximate entry 486, a minor portion of the liquid coolant flowing into fluid channel 478 is directed into first-encountered auxiliary coolant groove 490 at first location 492; the major portion of the bifurcated liquid coolant flow through fluid channel 478 continues along helical groove 482. The minor portion of liquid coolant received into auxiliary coolant groove 490 is conveyed therealong through first-encountered zone 496, in the space between superposed surfaces 474 and 476, and convectively absorbs heat from zone 496 before rejoining the major portion of the bifurcated liquid coolant flow through helical groove 482 at second location 493, downstream of which the coolant flow through fluid channel 478 is no longer bifurcated, but unified, until third location 494 is encountered. Liquid coolant initially received into auxiliary coolant groove 490 at first location 492 flows into zone 496 and towards apex 499 formed by groove 490 in a direction generally opposite to that of the flow through helical groove 482. Along groove 490, apex 499 is located between locations 492 and 493. Once coolant flowing through groove 490 reaches apex 499 thereof, the general direction of coolant flow along groove 490 changes to approximately that of the coolant flow through helical groove 482. The flows of liquid coolant through grooves 490 and 482 then converge and are merged at second location 493. Notably, at first location 492 the opening to auxiliary coolant groove 490 is oriented, relative to helical groove 482, to receive liquid coolant under pressure. At second location 493, the opening from auxiliary coolant groove 490 is oriented, relative to helical groove 482, to facilitate the merger of the minor and major portions of the liquid coolant flow along flow path 480.

Referring to the right-hand side of FIG. 36, liquid coolant is conveyed under pressure through helical groove 482 downstream of second location 493. A minor portion of the liquid coolant flow through fluid channel 478 is received into the opening of second-encountered auxiliary coolant groove 491 at third location 494; the major portion of the bifurcated liquid coolant flow passes the entrance opening to auxiliary coolant groove 491 at third location 494 and continues along helical groove 482 towards fluid channel exit 488. Proximate exit 488, auxiliary coolant groove 491 is fluidly connected to helical groove 482 at fourth location 495, where the minor portion of the bifurcated liquid coolant flow through auxiliary coolant groove 491 is reintroduced to the major portion. The unified liquid coolant then exits fluid channel 478 via exit 488. The minor portion of liquid coolant received into auxiliary coolant groove 491 is conveyed therealong through second-encountered zone 497, in the space between superposed surfaces 474 and 476, and convectively absorbs heat from zone 497 before rejoining the major portion of the bifurcated liquid coolant flow through helical groove 482 at fourth location 495, downstream of which the coolant flow through fluid channel 478 is no longer bifurcated, but unified. Liquid coolant initially received into auxiliary coolant groove 491 at third location 494 flows into zone 497 and towards apex 499 formed by groove 491 in a direction diverging from, but generally the same as, that of the coolant flow through helical groove 482. Along groove 491, apex 499 is located between locations 494 and 495. Once this coolant reaches apex 499 of groove 491, the direction of coolant flow through groove 491 changes to generally oppose that of the flow through helical groove 482, and the coolant flows are merged at fourth location 495, proximate exit 488. Notably, at third location 494, the opening to auxiliary coolant groove 491 is oriented, relative to helical groove 482, to receive liquid coolant under pressure. At fourth location 495, the opening from auxiliary coolant groove 491 is oriented, relative to helical groove 482, to facilitate the merger of the minor and major portions of the liquid coolant flow along flow path 480.

As shown, liquid coolant flow path 480 is defined by the primary portion 482 and secondary portions 490, 491 of fluid channel 478. First and second locations 492, 493 are fluidly connected in parallel via fluid channel secondary portion 490 and fluid channel primary portion 482. Third and fourth locations 494, 495 are fluidly connected in parallel via fluid channel secondary portion 491 and fluid channel primary portion 482. Thus, in machine 440 flow path 480 is defined by helical groove 482 and auxiliary coolant grooves 490, 491.

As best shown in FIG. 34, the axially inward end of first coolant fitting 454 is fluidly connected to port 512 in the axial end portion of cylindrical jacket 470 at the front of machine 440. Gasket or seal 513 seals the joint between front cover 460 and jacket 470 about port 512. Port 512 is fluidly connected to entry 486 of fluid channel 478. Liquid coolant under pressure is thus introduced to machine 440 through coolant inlet 454, and flows to fluid channel 478 through port 512 and entry 486.

Generally cylindrical jacket 470 has an interior volume and an at least partially enclosing axial end portion 500, at the rear of machine 440. Jacket axial end portion 500 partially encloses the jacket interior volume, in which rotor 42 and stator 444 are located. Fluid chamber 502 is defined by walls 504 of jacket axial end portion 500, with fluid chamber 502 being fluidly connected to fluid channel 478. Walls 504 of fluid chamber 502, and rear cover 458, define substantially annular fluid passage 506 that extends between first and second openings 508, 510, and defines flow path 480 for liquid coolant through machine 440. First opening 508 of fluid passage 506 is fluidly connected to exit 488 of fluid channel 478. Liquid coolant received into fluid passage 506 is directed annularly about central axis 64 along flow path 480 through passage 506, to second opening 510. Second opening 510 is fluidly connected to the axially inward end of second coolant fitting 456, which is the coolant outlet from machine 440. Gasket or seal 514 seals the joint between jacket 470 and rear cover 458 to prevent liquid coolant leakage from fluid passage 506. Alternatively, second opening 508 of fluid chamber 502 may be located in the cylindrical outer wall of jacket 470, with second coolant fitting 456 being fitted thereinto rather than affixed to rear cover 458 as described above and depicted in the drawings. Also, alternatively, port 512 may be located in the cylindrical outer wall of jacket 470, with first coolant fitting 454 being fitted thereinto rather than affixed to front cover 460 as described above and depicted in the drawings. In such alternative, unshown embodiment(s), the coolant inlet and outlet fittings extend radially from machine 440, rather than being carried by and extending axially from front and rear covers 460, 458.

Disposed radially inwardly of the annular fluid chamber 502 is cavity 516 defined by jacket axial end portion walls 504. Cavity 516 is substantially surrounded by fluid chamber 502, and cavity 516 and chamber 502 are in conductive thermal communication through wall 504 separating them, much as in first embodiment machine 40. Disposed within cavity 516, and in conductive thermal communication with wall 504, is a heat source 518 in the form of power electronics module 520, which may be similar to power electronics 120 of machine 40. Shaft rear bearing 69, supported in bearing mount portion 522 defined by walls 504 of jacket axial end portion 500, is another heat source 518 of machine 440.

Heat transferrable from heat source(s) 518 through jacket axial end portion walls 504 is convectively transferrable to liquid coolant along flow path 480 within the fluid passage 506. Thus, heat from stator 444 and from additional heat source(s) 518 (e.g., power electronics module 520 or rear bearing 69) is convectively transferrable to liquid coolant via the cylindrical wall of jacket 470 and jacket axial end portion 500.

Figure 35:
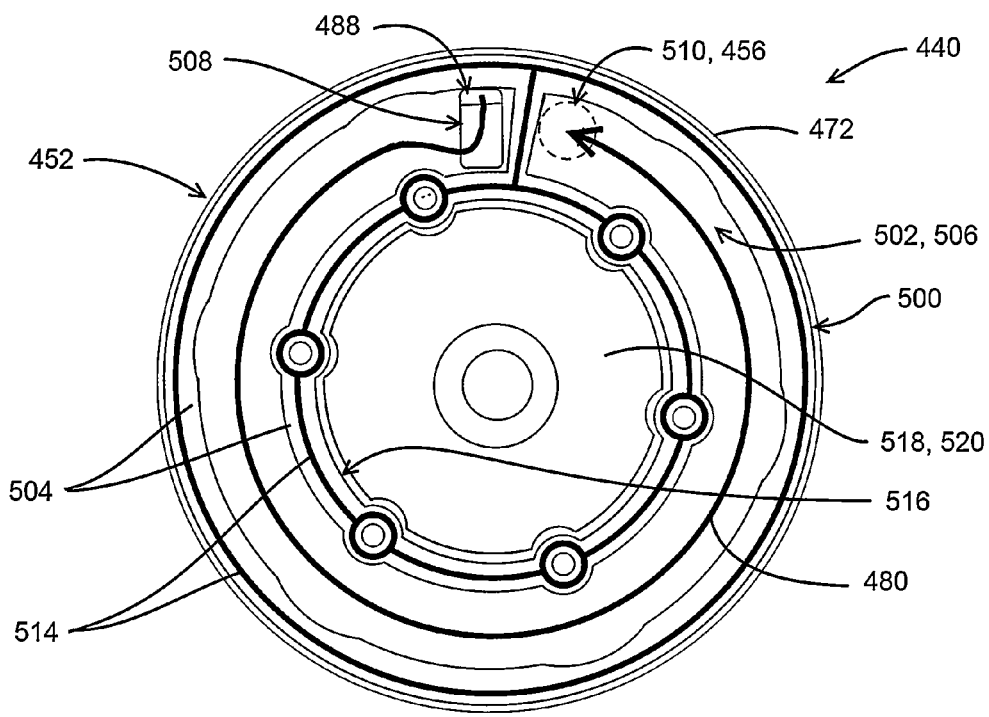
FIG. 35 is a rear end view of the fifth embodiment rotary electric machine without its rear cover, taken along line 35-35 of FIG. 33.

From the drawings and the above description, it can therefore be understood that flow path 480 for liquid coolant through machine 440 begins at first coolant fitting 454, proceeds through fluid channel 478, flows through annular fluid passage 506, and ends at second coolant fitting 456. More particularly, liquid coolant received into machine 440 through coolant inlet 454 and port 512 enters fluid distribution channel 478 via entry 486, and is bifurcated at location 492 proximate to entry 486. A major portion of the bifurcated flow follows a primary portion of fluid channel 478 along helical groove 482, which simultaneously extends circumferentially about and progresses axially in a direction along axis 64, and a minor portion of the bifurcated flow follows a secondary portion of fluid channel 478 along auxiliary coolant groove 490, which traverses zone 496 and extends between locations 492 and 493 spaced along helical groove 482. The bifurcated flows are joined at location 493, and the unified coolant flow continues along helical groove 482 to location 494, at which it is again bifurcated. A major portion of the bifurcated flow follows a primary portion of fluid channel 478 along helical groove 482, which continues to simultaneously extend circumferentially about and progress axially in a direction along axis 64, and a minor portion of the bifurcated flow follows a secondary portion of fluid channel 478 along auxiliary coolant groove 491, which traverses zone 497 and extends between locations 494 and 495 spaced along helical groove 482. The bifurcated flows are joined at location 495 proximate to exit 488, and the unified coolant flow continues through exit 488 to first opening 508 of fluid passage 506. Flow path 480 continues annularly about cavity 516 to fluid passage second opening 510, then is expelled from machine 440 through coolant outlet 456. Referring to FIGS. 35 and 36, flow path 480 for liquid coolant through machine 440 is indicated by directional arrows.

While exemplary embodiments have been disclosed hereinabove, the present disclosure is not limited to the disclosed embodiments. Instead, this application is intended to cover any variations, uses, or adaptations of the present disclosure using its general principles. Further, this application is intended to cover such departures from the present disclosure as come within known or customary practice in the art to which this present disclosure pertains and which fall within the limits of the appended claims.

What is claimed is:

1. A liquid-cooled rotary electric machine comprising:
   a coolant inlet and a coolant outlet;
   a stator having a central axis;
   a rotor surrounded by the stator and having rotation relative to the stator about the central axis;
   a jacket defining a heat transfer surface in conductive thermal communication with the stator, the jacket having opposite axial ends, an interior volume in which the stator and rotor are located, and an axial end portion having walls, the interior volume partially enclosed by the jacket axial end portion;
   a fluid channel traversing the jacket heat transfer surface between the jacket axial ends;
   a fluid passage defined by jacket axial end portion walls and in fluid communication with the fluid channel, a flow path of liquid coolant through the machine defined by the fluid channel and the fluid passage between the coolant inlet and the coolant outlet; and
   a heat source in conductive thermal communication with a jacket axial end portion wall, whereby at least a portion of heat transferable between the heat source and the fluid passage is convectively transferable between the jacket axial end portion walls and liquid coolant along the flow path;
   wherein the fluid passage has first and second openings between which the flow path of liquid coolant through the machine extends, the fluid channel and the fluid passage fluidly connected to each other via one of the first and second openings; and
   wherein the flow path is generally spiral-shaped and extends about the stator central axis with changing radial distance therefrom between the first and second openings.

2. The machine of claim 1, wherein the other of the first and second openings is fluidly connected to one of the coolant inlet and the coolant outlet.

3. The machine of claim 2, wherein the jacket axial end portion walls define a port isolated from the fluid passage and to which the fluid channel is fluidly connected, and the other of the coolant inlet and the coolant outlet is fluidly connected to the port.

4. The machine of claim 1, wherein the first and second openings are located at opposite ends of the fluid passage along the flow path.

5. The machine of claim 1, wherein the heat source is located axially adjacent to a jacket axial end portion wall relative to the central axis.

6. The machine of claim 1, wherein the heat source is located radially adjacent to a jacket axial end portion wall relative to the central axis.

7. The machine of claim 1, wherein the jacket axial end portion fully encloses the interior volume at one jacket axial end.

8. The machine of claim 1, wherein the fluid passage and the heat source do not overlap axially.

9. The machine of claim 1, wherein the machine comprises power electronics, and the heat source comprises the power electronics.

10. The machine of claim 9 wherein the machine comprises a cover disposed over the jacket axial end portion and defining the fluid passage, a jacket axial end portion wall disposed between the cover and the power electronics.

11. The machine of claim 1, wherein the machine comprises a bearing supported by the jacket axial end portion, the rotor is supported within the jacket interior volume by the bearing, and the heat source comprises the bearing.

12. The machine of claim 1, wherein the heat source is located axially between the rotor and the fluid passage.

13. The machine of claim 1, wherein relative to the central axis, a portion of the fluid passage extends radially outward of the heat source.

14. The machine of claim 1, further comprising a separable cover that defines the fluid passage, and wherein the fluid passage is located between the rotor and the cover in a direction parallel to the central axis.

15. The machine of claim 14, wherein a jacket axial end portion wall is disposed axially between the cover and the heat source.

16. The machine of claim 1, wherein the heat source is disposed axially between the rotor and the jacket axial end portion.

17. A method for liquid-cooling a rotary electric machine, comprising the steps of:
   conveying liquid coolant along a fluid channel traversing a heat transfer surface of a jacket in conductive thermal communication with a stator surrounding a rotor, and along a fluid passage fluidly connected in series to the fluid channel and defined by a jacket axial end portion partially enclosing an interior volume in which the stator and rotor are located; and
   convectively transferring heat from the stator through the heat transfer surface and from a heat source in conductive thermal communication with a wall of the jacket axial end portion, to liquid coolant along a flow path defined by the fluid channel and the fluid passage that extends between a coolant inlet and a coolant outlet of the machine;
   wherein the fluid passage has first and second openings between which the flow path of liquid coolant through the machine extends, the fluid channel and the fluid passage fluidly connected to each other via one of the first and second openings; and
   wherein the flow path is generally spiral-shaped and extends about a stator central axis with changing radial distance therefrom between the first and second openings.

* * * * *